United States Patent [19]

McWhirter et al.

[11] Patent Number: 5,018,065
[45] Date of Patent: May 21, 1991

[54] PROCESSOR FOR CONSTRAINED LEAST SQUARES COMPUTATIONS

[75] Inventors: John G. McWhirter, Malvern Wells; Terence J. Shepherd, Malvern, both of England

[73] Assignee: The Secretary of State for Defence in Her Britannic Majesty's Government of the United Kingdom of Great Britain and Northern Ireland, London, England

[21] Appl. No.: 256,999

[22] Filed: Oct. 13, 1988

[51] Int. Cl.$^5$ .............................................. G06F 7/38
[52] U.S. Cl. ................................. 364/900; 364/231.9; 364/258; 364/258.2; 364/232.9
[58] Field of Search ... 364/200 MS File, 900 MS File, 364/735, 736, 754

[56] References Cited

U.S. PATENT DOCUMENTS

| | | | |
|---|---|---|---|
| 4,493,048 | 1/1985 | Kung et al. | 364/754 |
| 4,727,503 | 2/1988 | McWhirter | 364/200 |
| 4,769,779 | 10/1988 | Chang et al. | 364/754 |
| 4,823,299 | 4/1989 | Chang et al. | 364/735 |

*Primary Examiner*—Gareth D. Shaw
*Assistant Examiner*—John Chavis
*Attorney, Agent, or Firm*—Nixon & Vanderhye

[57] ABSTRACT

A processor is provided which is suitable for constrained least squares computations. It incorporates a systolic array of boundary, internal, constraint and multiplier cells arranged as triangular and rectangular sub-arrays. The triangular sub-array contains boundary cells along its major diagonal and connected via delays, together with above-diagonal internal cells. It computes and updates a QR decomposition of a data matrix $\underline{X}$ incorporating successive data vectors having individual signals as elements. The rectangular sub-array incorporates constraint cell columns each implementing a respective constraint vector and terminating at a respective multiplier cell. The constraint cells store respective conjugate constraint factors obtained by constraint vector transformation in the triangular sub-array. Rotation parameters produced by QR decomposition in the triangular sub-array are employed by the rectangular sub-array to rotate a zero input and update stored constraint factors. Cumulative rotation of this input and summation of squared moduli of constraint factors are carried out in cascade down constraint columns. The boundary cells are arranged for cumulative multiplication of cosine rotation parameters. Multiplier cells multiply cumulatively multiplied cosine parameters by cumulatively rotated constraint column inputs and divide by summed squared moduli of constraint factors to provide residuals. Each constraint column produces respective residuals in succession corresponding to weighting of the data matrix $\underline{X}$ to produce minimum signals subject to a respective constraint governing the form of weighting, as required to compute minimum variance distortionless response (MVDR) results.

10 Claims, 6 Drawing Sheets

Fig. 3.

| CELL \ MODE | MODE 1 (IF M=1) | MODE 2 (IF M=0) |
|---|---|---|
| (a) BOUNDARY CELL<br><br>$(x_{IN}, M)$<br>$\gamma_{IN} \rightarrow \bigcirc r \rightarrow (c,s)$<br>$42 \searrow \gamma_{OUT}$ | $(r' \leftarrow \beta^2 r^2 + \|x_{IN}\|^2)^{\frac{1}{2}}$<br>IF $x_{IN} = 0$ THEN<br>$(c \leftarrow 1; s \leftarrow 0)$<br>OTHERWISE<br>$(c \leftarrow \beta r/r'; s \leftarrow x_{IN}/r')$<br>$r \leftarrow r'; \gamma_{OUT} \leftarrow c\gamma_{IN}$ | $c \leftarrow 1; s \leftarrow x_{IN}/r$<br>$\gamma_{OUT} \leftarrow \gamma_{IN}$ |
| (b) INTERNAL CELL<br><br>$(x_{IN}, M)$<br>$(c,s) \rightarrow \boxed{r} \rightarrow (c,s)$<br>$44 \downarrow$<br>$(x_{OUT}, M)$ | $x_{OUT} \leftarrow cx_{IN} - s\beta r$<br>$r \leftarrow s^* x_{IN} + c\beta r$ | $x_{OUT} \leftarrow x_{IN} - sr$ |
| (c) CONSTRAINT CELL<br><br>$(x_{IN}, \lambda_{IN}, M)$<br>$\swarrow 46$<br>$(c,s) \rightarrow \diamond a \rightarrow (c,s)$<br>$\downarrow$<br>$(x_{OUT}, \lambda_{OUT}, M)$ | $x_{OUT} \leftarrow cx_{IN} - s\beta a$<br>$a \leftarrow s^* x_{IN}/\beta^2 + ca/\beta$<br>$\lambda_{OUT} \leftarrow \lambda_{IN} + \|a\|^2$ | $x_{OUT} \leftarrow x_{IN}; \lambda_{OUT} \leftarrow \lambda_{IN}$<br>IF $x_{IN} = 1$ THEN<br>$(a \leftarrow s^*)$ |
| (d) MULTIPLIER CELL<br><br>$(x_{IN}, \lambda_{IN}, M)$<br>$\gamma \rightarrow \bigcirc \mu \rightarrow \gamma$<br>$48 \downarrow$<br>$x_{OUT}$ | IF $\lambda_{IN} = 0$ THEN<br>$(x_{OUT} \leftarrow 0)$<br>OTHERWISE<br>$(x_{OUT} \leftarrow -\gamma x_{IN} \mu/\beta^2 \lambda_{IN})$ | $x_{OUT} \leftarrow 0$ |

Fig. 4.

| CELL \ MODE | MODE 1 (IF M=1) | MODE 2 (IF M=0) |
|---|---|---|
| (a) BOUNDARY CELL<br>$(x_{IN}, M)$, $\gamma_{IN}$ → (circle $r$, 42) → $(c,s)$, $\gamma_{OUT}$ | $r' \leftarrow (\beta^2 r^2 + \|x_{IN}\|^2)^{\frac{1}{2}}$<br>$c \leftarrow \beta r/r'$; $s \leftarrow x_{IN}/r'$<br>$r \leftarrow r'$; $\gamma_{OUT} \leftarrow c\gamma_{IN}$ | $c \leftarrow 1$; $s \leftarrow x_{IN}/r$<br>$\gamma_{OUT} \leftarrow \gamma_{IN}$ |
| (b) INTERNAL CELL<br>$(x_{IN}, M)$, $(c,s)$ → (square $r$, 44) → $(c,s)$, $(x_{OUT}, M)$ | $x_{OUT} \leftarrow cx_{IN} - s\beta r$<br>$r \leftarrow s^* x_{IN} + c\beta r$ | $x_{OUT} \leftarrow x_{IN} - sr$ |
| (c) CONSTRAINT CELL<br>$(x_{IN}, \lambda_{IN}, M)$, $(c,s)$ → (diamond $a$, 46) → $(c,s)$, $(x_{OUT}, \lambda_{OUT}, M)$ | $x_{OUT} \leftarrow cx_{IN} - s\beta a$<br>$a \leftarrow s^* x_{IN}/\beta^2 + ca/\beta$<br>$\lambda_{OUT} \leftarrow \lambda_{IN}$ | $x_{OUT} \leftarrow x_{IN}$<br>IF $x_{IN} = 1$, THEN<br>$(a \leftarrow s^*; \lambda_{OUT} \leftarrow \lambda_{IN} + \|a\|^2)$<br>OTHERWISE<br>$(\lambda_{OUT} \leftarrow \lambda_{IN})$ |
| (d) MULTIPLIER CELL<br>$(x_{IN}, \lambda_{IN}, M)$, $\gamma$, $\mu$, $\lambda$ → (circle 48) → $\gamma$, $x_{OUT}$ | $\lambda \leftarrow (\lambda - \|x_{IN}\|^2/\beta^2)/\beta^2$<br>IF $\lambda = 0$, THEN<br>$(x_{OUT} \leftarrow 0)$<br>OTHERWISE<br>$(x_{OUT} \leftarrow -\gamma x_{IN} \mu/\beta^2 \lambda)$ | $x_{OUT} \leftarrow x_{IN}$<br>IF $x_{IN} = 1$, THEN<br>$(\lambda \leftarrow \lambda_{IN})$ |

Fig. 5.

| CELL \ MODE | MODE 1 (IF M=1) | MODE 2 (IF M=0) |
|---|---|---|
| (a) BOUNDARY CELL<br><br>$(x_{IN}, M)$, $\delta_{IN}$, 42 → (d) → $(\bar{c}, \bar{s}, d', z)$, $\delta_{OUT}$ | $d' = \beta^2 d + \delta_{IN}\|x_{IN}\|^2$<br>$\bar{c} \leftarrow \beta^2 d/d'$; $\bar{s} \leftarrow \delta_{IN} x_{IN}/d'$<br>$d \leftarrow d'$; $\delta_{OUT} \leftarrow \bar{c}\delta_{IN}$<br>$z \leftarrow x_{IN}$ | $\bar{c} \leftarrow 1$; $\bar{s} \leftarrow 0$; $d \leftarrow d'$<br>$\delta_{OUT} \leftarrow \delta_{IN}$; $z \leftarrow x_{IN}$ |
| (b) INTERNAL CELL<br><br>$(x_{IN}, M)$<br>$(\bar{c}, \bar{s}, d', z) \rightarrow \square \rightarrow (\bar{c}, \bar{s}, d', z)$<br>44<br>$(x_{OUT}, M)$ | $x_{OUT} \leftarrow x_{IN} - zr$<br>$r \leftarrow \bar{c}r + \bar{s}^* x_{IN}$ | $x_{OUT} \leftarrow x_{IN} - zr$ |
| (c) CONSTRAINT CELL<br><br>$(x_{IN}, \lambda_{IN}, M)$<br>$(\bar{c}, \bar{s}, d', z) \rightarrow \diamond \rightarrow (\bar{c}, \bar{s}, d', z)$<br>46<br>$(x_{OUT}, \lambda_{OUT}, M)$ | $x_{OUT} \leftarrow x_{IN} - za$<br>$a \leftarrow (\bar{c}a + \bar{s}^* x_{IN})/\beta^2$<br>$\lambda_{OUT} \leftarrow \lambda_{IN} + d'\|a\|^2$ | $x_{OUT} \leftarrow x_{IN}$; $\lambda_{OUT} \leftarrow \lambda_{IN}$<br>IF $x_{IN} = 1$ THEN<br>$(a \leftarrow z^*/d')$ |
| (d) MULTIPLIER CELL<br><br>$(x_{IN}, \lambda_{IN}, M)$<br>$\delta \rightarrow \bigcirc \rightarrow \delta$<br>$\mu$, $\lambda$ → 48<br>$x_{OUT}$ | IF $\lambda_{IN} = 0$ THEN<br>$(x_{OUT} \leftarrow 0)$<br>OTHERWISE<br>$(x_{OUT} \leftarrow -\delta x_{IN} \mu/\beta^2 \lambda_{IN})$ | $x_{OUT} \leftarrow 0$ |

Fig. 6.

| CELL \ MODE | MODE 1 (IF M=1) | MODE 2 (IF M=0) |
|---|---|---|
| (a) BOUNDARY CELL<br><br>$(x_{IN}, M)$<br>$\delta_{IN} \searrow \quad \downarrow$<br>$\quad \bigcirc d \rightarrow (\bar{c}, \bar{s}, d', z)$<br>$42 \quad \downarrow$<br>$\quad \delta_{OUT}$ | $d' = \beta^2 d + \delta_{IN}\|x_{IN}\|^2$<br>$\bar{c} \leftarrow \beta^2 d/d'; \bar{s} \leftarrow \delta_{IN} x_{IN}/d'$<br>$d \leftarrow d'; \delta_{OUT} \leftarrow \bar{c}\delta_{IN}$<br>$z \leftarrow x_{IN}$ | $\bar{c} \leftarrow 1; \bar{s} \leftarrow 0$<br>$d' \leftarrow d; \delta_{OUT} \leftarrow \delta_{IN}$<br>$z \leftarrow x_{IN}$ |
| (b) INTERNAL CELL<br><br>$(x_{IN}, M)$<br>$(\bar{c},\bar{s},d',z) \rightarrow \square \rightarrow (\bar{c},\bar{s},d',z)$<br>$\quad 44$<br>$(x_{OUT}, M)$ | $x_{OUT} \leftarrow x_{IN} - zr$<br>$r \leftarrow \bar{c}r + \bar{s}^* x_{IN}$ | $x_{OUT} \leftarrow x_{IN} - zr$ |
| (c) CONSTRAINT CELL<br><br>$(x_{IN}, \lambda_{IN}, M)$<br>$\quad \diagdown 46$<br>$(\bar{c},\bar{s},d',z) \rightarrow \diamondsuit a \rightarrow (\bar{c},\bar{s},d',z)$<br>$\quad \downarrow$<br>$(x_{OUT}, \lambda_{OUT}, M)$ | $x_{OUT} \leftarrow x_{IN} - za$<br>$a \leftarrow (\bar{c}r + \bar{s}^* x_{IN})/\beta^2$<br>$\lambda_{OUT} \leftarrow \lambda_{IN}$ | $x_{OUT} \leftarrow x_{IN}$<br>IF $x_{IN} = 1$ THEN<br>$(a \leftarrow z^*/d')$<br>$\lambda_{OUT} \leftarrow \lambda_{IN} + d'\|a\|^2)$<br>OTHERWISE<br>$(\lambda_{OUT} \leftarrow \lambda_{IN})$ |
| (d) MULTIPLIER CELL<br><br>$(x_{IN}, \lambda_{IN}, M)$<br>$\delta \rightarrow \bigcirc \rightarrow \delta$<br>$\mu \nearrow \quad 48$<br>$\lambda \quad x_{OUT}$ | $\lambda \leftarrow (\lambda - \delta\|x_{IN}\|^2/\beta^2)/\beta^2$<br>IF $\lambda = 0$ THEN<br>$(x_{OUT} \leftarrow 0)$<br>OTHERWISE<br>$(x_{OUT} \leftarrow -\delta x_{IN}\mu/\beta^2\lambda)$ | $x_{OUT} \leftarrow x_{IN}$<br>IF $x_{IN} = 1$ THEN<br>$(\lambda \leftarrow \lambda_{IN})$ |

PROCESSOR FOR CONSTRAINED LEAST SQUARES COMPUTATIONS

TECHNICAL FIELD

This invention relates to a processor for constrained least squares computations, such as the minimum variance distortionless response (MVDR) of an array of devices generating successive sets of signals.

BACKGROUND OF THE INVENTION

The MVDR computation is a well known problem in, for example, the field of radar beamforming employing an array of receiver antennas. It is also relevant to other sensors such as sonar transducer arrays. In one aspect, it may be considered as the computation of the minimum output from an array of receivers for each of a number of array "look" directions subject to the array gain in the respective direction remaining constant. This is equivalent to combining the array output signals so that unwanted contributions received other than from the required direction tend to cancel out, while antenna array gain in the required direction is preserved. The MVDR problem relates to achieving this result for a plurality of directions simultaneously; i.e. array output signals are required to be processed to yield noise-reduced signals or residuals corresponding to a number of different "look" directions.

Mathematically, the MVDR problem may be described as follows. Consider an array of m receivers each producing successive output signals, the ith signal from the jth receiver being designated $x_{ij}$ (i=1,2,3 ..., j=1 to m). An array of receivers is normally arranged to provide synchronous outputs, so the ith set of signals obtained from such an array at time $t_i$ consists of $x_{i1}$ to $x_{im}$. This signal set is treated as a row vector $\underline{x}^T(t_i)$, where the symbol T indicates the transpose of a column vector. Successive sets of signals or row vectors $\underline{x}^T(t_i)$ ... provide the rows of a data matrix $\underline{X}$ comprising the receiver array output over a period of time. The required noise-reduced signal or residual for the kth array look direction corresponding to the ith set of signals is defined as $e^{(k)}(t_i)$ (k=1,2 ...). Each of the residuals is generated by forming a respective linear combination of the ith set of antenna signals $\underline{x}^T(t_i)$ with a respective set of (complex) weighting coefficients expressed as a weight vector $\underline{w}^{(k)}(i)$ in each case, i.e.

$$e^{(k)}(t_i) = \underline{x}^T(t_i)\underline{w}^{(k)}(i) \quad (1)$$

The weight vector $\underline{w}^{(k)}(i)$ for the kth direction is that calculated over all signals generated up to time $t_i$, i.e. $\underline{x}^T(t_1), \underline{x}^T(t_2), \ldots \underline{x}^T(t_i)$ which form the data matrix of i rows $\underline{X}(i)$. The weight vector $\underline{w}^{(k)}(i)$ is that which minimize $||\underline{X}(i)\underline{w}^{(k)}(i)||$ subject to a linear constraint of the form:

$$\underline{c}^{(k)T}\underline{w}^{(k)}(i) = \mu^{(k)} \quad (2)$$

Equation (2) defines the set of constraint vectors $\underline{c}^{(k)T}(k=1,2, \ldots)$ which in turn define the required array look directions. It imposes the condition that the product of the kth weight vector and the kth constraint must yield a constant value $\mu^{(k)}$ corresponding to the receiver array gain in the kth look direction. Equations (1) and (2) collectively define the MVDR problem of simultaneously calculating noise-reduced signal residuals $e^{(k)}(t_i)$ by weighting subject to constraint vectors $\underline{c}^{(k)T}$ defining selected look directions (or other preconditions for applications outside the direction-finding field).

The prior art does not provide a processor capable of generating MVDR residuals from an array of sensors. At best, it requires a plurality of processors, one for each look direction. British Patent No. 2,151,378B describes a systolic array processor for computing residuals without constraints for a related but different problem. It treats the case of a main antenna generating successive signals of the kind $y(t_i)$ (or $y_i$) and associated auxiliary antennas generating successive sets of signals $\underline{x}^T(t_i)$, mathematical nomenclature having been altered for conformity with the preceding discussion. The approach is to carry out a QR decomposition of the data matrix $\underline{X}(i)$ of auxiliary antenna signals. The QR decomposition process is described in the prior art by Gentleman and Kung, "Matrix triangularisation by systolic arrays", Proc. SPIE, Vol. 298, Real Time Signal Processing IV (1981). It involves the use of a triangular systolic array processor to triangularise the data matrix $\underline{X}(i)$, the array incorporating boundary cells along its major diagonal together with above-diagonal internal cells. The boundary cells compute rotation parameters from input data and the internal cells apply them to input data. In consequence, the data matrix $\underline{X}(i)$ becomes transformed to a triangular matrix $\underline{R}$ by operation of the rotation matrix $\underline{Q}$ comprising the rotation parameters. The rotation parameters are then employed to rotate or transform successive main antenna signals $y(t_i)$, and the resulting cumulatively rotated versions of $y(t_i)$ are multiplied by cumulatively multiplied cosine rotation parameters to provide the required residuals. The residuals take the form of $\underline{x}^T(t_i)\underline{w}(i) + y(t_i)$; i.e. a weighted linear combination of the auxiliary antenna signals is formed with the object of cancelling out unwanted noise contributions contained in the main antenna signal $y(t_i)$. The weight vector $\underline{w}(i)$ is however not subject to any constraint. Moreover, in many important array signal processing applications, there is no main antenna or other sensor. All receivers of a typical array are equivalent. It is therefore inappropriate to arbitrarily designate one receiver as a main receiver and the remainder as auxiliaries, particularly since failure of the designated main receiver renders signal processing inoperative. It is a requirement of array signal processing that it should degrade gracefully. Progressive in-service failure of individual receivers in an array should not produce sudden catastrophic loss of output from the whole array.

British Patent No. 2,143,378B (U.S. Pat. No. 4,688,187) discloses a processor for the application of one or more constraints to sets of signals from a sensor array or the like. Here again the approach involves designating one sensor signal as a main signal and signals from other array sensors as auxiliaries. The required constraint vector is introduced by subtracting from each auxiliary signal the product of the main signal with a respective constraint coefficient. To introduce multiple constraints in combination, i.e. to apply a constraint matrix, this procedure is repeated in one or more subsequent processors. After introduction of the constraint or constraints, signal residuals may be obtained by passing signals output from the processor to a device in accordance with British Patent No. 2,151,378B previously mentioned.

The use of a constraint matrix or simultaneously applied multiple constraints is also described by McWhirter and Shepherd in "A systolic array for linearly constrained least-squares problems", Proc. SPIE, Vol. 696, Advanced Algorithms and Architectures for Signal Processing (1986). This discloses a systolic array having a constraint pre-processing section coupled to a residual extraction section.

It also dispenses with the requirement for one main signal distinct from auxiliaries, all signals being treated equivalently. It is capable of applying a plurality of constraint vectors in combination, i.e. a constraint matrix. However, in order to deal with the MVDR problem, it is necessary to apply a plurality of constraints separately and produce respective residuals for each constraint independently. To achieve this employing the prior art of McWhirter and Sherpherd requires a separate processor for each constraint. Each processor would comprise a constraint application section coupled to a residual extraction section. Such a multiplicity of processors is undesirably complex and expensive.

The MVDR problem has been analysed mathematically by R. Schreiber, in "Implementation of adaptive array algorithms", IEEE Trans., Vol. ASSP-34, No. 5, p. 1038 (1986). Schreiber provides an algorithm involving steps each of which appears to be implementable on some (undisclosed) form of systolic array. However, the algorithm as a whole appears to be incompatible with prior art systolic array design. One step in Schreiber's algorithm (triangular matrix update) would require each input data vector to be passed downwards from the top row of a triangular processor array to the bottom at the rate of one processor row per clock cycle. Another step (the back substitution process) would require the same vector of data to be passed upwards through the same array at the rate of one row per clock cycle. Both steps must be completed before the next data vector is input to the top row of the array. This requires of the order of m clock cycles, where m is the number of signal channels, and the throughput rate and efficiency of the array is greatly reduced as a result.

Bojanczyk and Luk describe an MVDR beamforming algorithm in Proc. SPIE, Vol. 826, Advanced Algorithms and Architectures for Signal Processing II (1987). Like McWhirter and Shepherd, their approach requires a respective preprocessing operation to be applied to sensor array signals for each of the required MVDR constraints. Consequently, the arithmetic operations required correspond to one processor per constraint as discussed earlier.

BRIEF SUMMARY OF THE INVENTION

It is an object of the present invention to provide a processor suitable for executing the MVDR computation.

The present invention provides a processor for constrained least squares computations including a systolic array of boundary, internal and constraint cells connected to form rows and columns, and wherein:
(1) the rows include boundary cells connected to constraint cells via numbers of internal cells diminishing down the array by one per row to a row containing no internal cell,
(2) the columns comprise a first column having a boundary cell, intervening columns comprising individual boundary cells surmounted by respective numbers of internal cells increasing along the array by one per column, and at least one constraint cell column,
(3) the boundary cells have a mode of operation in accordance with a QR decomposition rotation algorithm and comprising evaluating rotation parameters from respective stored elements and input data and updating stored elements,
(4) the internal and constraint cells have a mode of operation in accordance with the rotation algorithm and comprising receiving evaluated rotation parameters and where necessary deriving their conjugates for application to respective stored elements and input data to provide rotated output data and updated stored elements,
(5) the array includes nearest neighbour cell interconnection lines providing for evaluated rotation parameters to pass along rows and rotated output data to pass down columns,
(6) the processor includes constraint column initializing means arranged to provide constraint cells with respective initial stored elements corresponding to constraint vector transformation by an R matrix of decomposed data,
(7) the array includes means for providing normalization factors corresponding to respective squared moduli of the results arising from constraint vector transformation by an R matrix of decomposed data and subsequent updating in accordance with the rotation algorithm,
(8) data input means are associated with the array for supplying first row boundary and internal cells with successive temporally skewed data vectors with each of such cells receiving one respective element per vector, and
(9) the array includes multiplying means arranged to generate cumulatively rotated constraint column outputs multiplied by cumulatively multiplied cosine or equivalent non-Givens rotation parameters and divided by respective normalization factors to produce residuals each derived from rotation parameters computed from a respective data vector and from stored elements prior to update with that data vector.

The invention provides the advantage that it is a single processor capable of executing MVDR computations involving any required number of independent, separately applied constraints. Unlike the prior art, only one set or sub-array of boundary and internal cells is required, this being connected to one or more subsequent constraint columns provided on the basis of one column per constraint vector.

The processor initializing means may include a storing device arranged to provide initial constraint cell elements and normalization factors obtained by constraint vector transformation on the basis of predetermined data, i.e. foreknowledge. Alternatively, the processor itself may be arranged to provide for initialization on the basis of received data. In this case, the processor may include:
(1) respective second modes of operation for the boundary, internal and constraint cells in which the boundary and internal cells suppress their stored element update function and the constraint cells replace their stored elements by initialization factors derived from input rotation parameters,
(2) data input mean arranged to furnish first row boundary and internal cells with a first series of data vectors, at least one constraint vector and a second series of data vectors, and (3) switching means arranged to:
   (i) switch boundary and internal cells between modes of operation prior and subsequent to constraint vector transformation in a manner which is progressive along rows and down columns of the array, and
   (ii) switch constraint cells to and from their second mode of operation prior and subsequent to transformed constraint vector element input respectively.

In a preferred embodiment, the processor of the invention incorporates a plurality of constraint columns for implementing respective constraint vectors. This embodiment may include switching means arranged to switch the constraint cell columns such that each stores a respective conjugate transformed constraint vector during second mode operation, and the multiplying means may include a respective multiplying means for each constraint cell column. The constraint columns may be arranged in parallel and connected to a common column of boundary and internal cells. Conveniently however the constraint columns are arranged in series.

The means for providing normalization factors may comprise means associated with constraint cells for implementing a constraint cell column function of summing squared moduli of stored elements. It may either also or alternatively include means for updating an initial normalization factor with the aid of constraint column outputs, such updating means being associated with the multiplying means. The updating means may be provided with an initial normalization factor by the constraint cells or alternatively by storing means containing predetermined data.

The processor of the invention may be arranged to weight computation of residuals in favour of more recent data. A weighting or "forget" factor $\beta$ ($0<\beta<1$) is employed in a manner which depends on the rotation algorithm implemented by the array. In the Givens rotation algorithm, boundary and internal cell stored elements are multiplied by $\beta$ before use in evaluating and applying rotation parameters and in updating stored elements. In the square root free algorithm, the factor $\beta^2$ multiplies stored elements of use in updating and in evaluating rotation parameters. Consequential changes are also made to constraint and multiplier cell functions as will be described later. The effect on the constraint cell function is to counteract diminution of transformed constraint vector elements.

The multiplying means preferably includes boundary cell processing means for relatively delaying and cumulatively multiplying cosine or non-Givens equivalent rotation parameters and at least one multiplier cell for processing constraint cell column outputs and products of cumulative multiplication.

In order that the invention might be more fully understood, embodiments thereof will now be described, by way of example only, with reference to the accompanying drawings, in which:

DETAILED DESCRIPTION OF THE EMBODIMENTS

Figure 1:
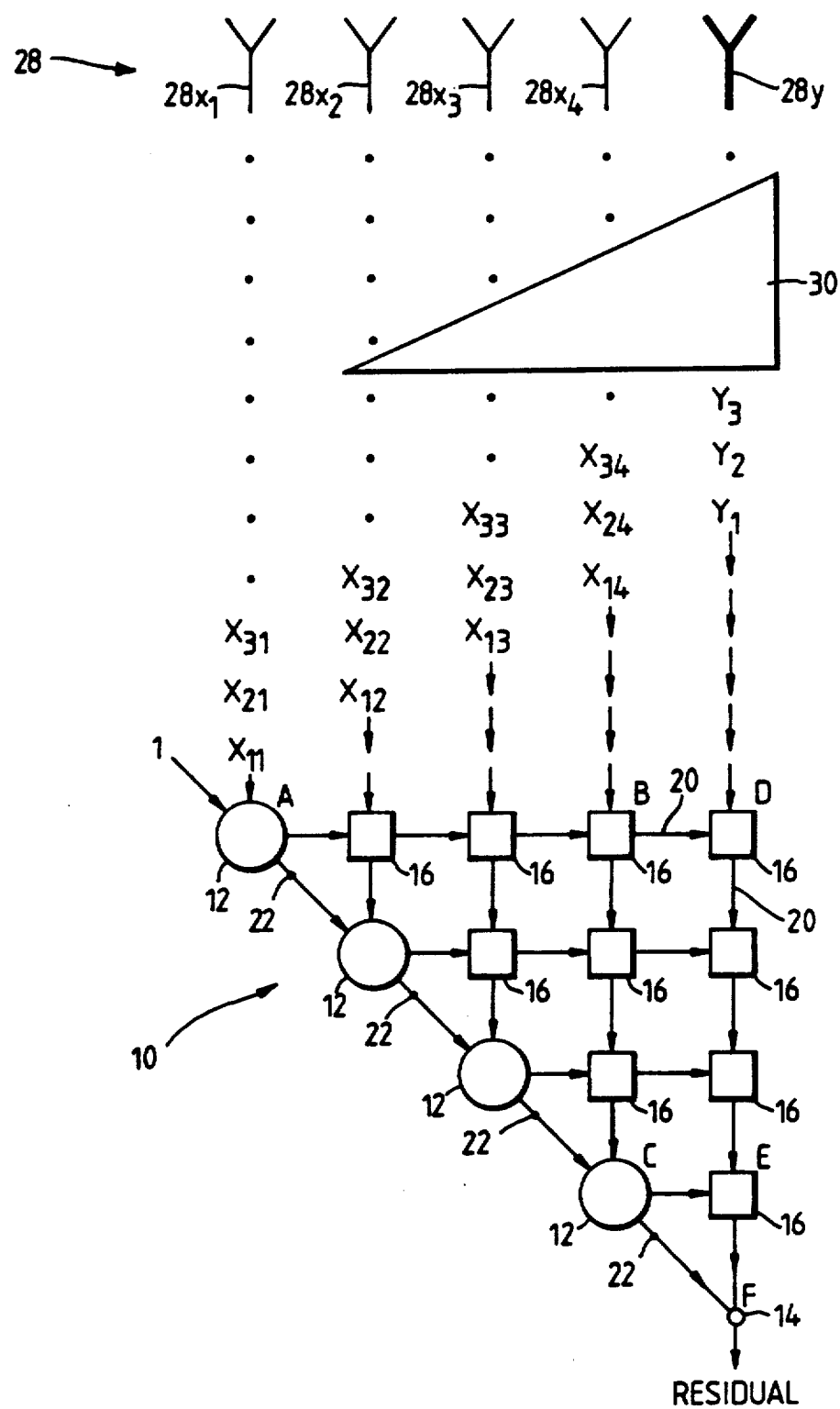
FIG. 1 is a schematic functional drawing of a prior art processor.

Referring to FIG. 1, there is shown a prior art processor 10 of the kind described in British Patent No. 2151378B. It consists of a triangular array of three different types of processing cell. Boundary cells 12 indicated by circles occupy array major diagonal locations other than the lowermost such location, which is occupied by a multiplier cell 14. Upper right or above-diagonal locations are occupied by internal cells 16. Each cell is connected to its immediate row and column neighbors by horizontal and vertical lines such as 20. In addition, each boundary cell 12 is connected diagonally downwards via a respective delay 22 to a successive boundary cell 12 or to the multiplier cell 14.

Each of the cells 12 to 16 receives input data from above, and the internal cells 16 pass outputs downwards to respective column neighbors. The boundary cells 12 receive an additional upper left input, and they generate outputs to the right both horizontally and diagonally below. The multiplier cell 14 generates an output vertically below.

The processor 10 receives input data values $x_{ij}$, $y_i$ ($i=1,2,3,4\ldots,j=1$ to 4) from an array 28 of five antennas, these being four auxiliary antennas $28x_1$ to $28x_4$ and one main antenna $28y$. The data values pass from the antenna array 28 to the processor 10 via a delay device 30, which imposes a temporal skew; i.e. each $x_{ij+1}$ is delayed relative to $x_{ij}$ by one processing cycle, as is $y_i$ (i.e. $y(t_i)$) relative to $x_{i4}$. Successive values $x_{ij}$ represent successive output signals from the jth auxiliary antenna $28x_j$, and are fed to the jth column of the processor 10.

A succession of n signals from each of the auxiliary antennas $28x_1$ to $28x_4$ forms an nx4 data matrix $\underline{X}$. The ith row of the data matrix $\underline{X}$ has elements $x_{i1}$ to $x_{i4}$, which is treated as a row vector $\underline{x}^T(t_i)$ (T=transpose symbol) representing the antenna array output at time $t_i$. Successive values $y_i$ from the main antenna $28y$ form a column vector $\underline{y}$ input to the fifth column of the processor 10.

The functions of the processing cells 12, 14 and 16 are as follows. Each boundary cell receives an input data value $x_{in}$ from above, and computes Givens sine and cosine parameters s and c. The parameters s and c are equivalent to the sine and cosine of a rotation angle $\theta$. The angle is that through which a vector comprising one row of the data matrix $\underline{X}$ must be rotated in order to reduce to zero its leading or left hand element. The significance of this operation is explained later. Each boundary cell 12 stores a respective matrix element r, which is initially zero and repeatedly updated. It receives successive input values $x_{in}$ from vertically above. It updates r and computes s and c in accordance with:

$$r' = [r^2 + x_{in}^2]^{\frac{1}{2}} \quad (2.1)$$

$$s = x_{in}/r' \quad (2.2)$$

$$c = r/r' \quad (2.3)$$

$$r(\text{updated}) = r' \quad (2.4)$$

The updated value of r replaces that previously stored in the respective boundary cell 12 and the computed s and c parameters are output to the respective neighboring internal cell 16 horizontally to the right. In addition, each boundary cell 12 receives an upper left diagonal input, multiplies it by the c parameter value and outputs the result diagonally below to the right.

Each internal cell 16 receives successive pairs of s and c parameters from the boundary or internal cell to its left, together with successive input values $x_{in}$ from vertically above. It employs these to update its respective stored element r and to compute an output value $x_{out}$ for transfer to the respective neighgboring cell vertically below. Its processing function is given by:

$$x_{out} = -sr + cx_{in} \quad (3.1)$$

$$r(updated) = cr + sx_{in} \quad (3.2)$$

The multiplier cell 14 receives inputs from the internal and boundary cells above and above left respectively. It multiplies these together to provide an output vertically below.

The processor 10 implements the Givens rotation algorithm to perform a QR decomposition on the matrix $\underline{X}$ of signals produced by the auxiliary antennas $28x_1$ to $28x_4$. This produces s and c rotation parameters whose effect is described by the matrix Q. They are subsequently employed to operate on the main antenna sequence of signals expressed as elements of the column vector $\underline{y}$. The Givens rotation algorithm is an approach to solving linear systems. In this algorithm, the co-ordinate system of a vector (such as a row of $\underline{X}$) undergoes a series of rotations such that successive vector elements become zero. In the first or uppermost row of the processor 10, $x_{11}$ is shown being input to a boundary cell 12. There it will be employed to generate s and c parameters which reduce it to zero when combined with the boundary cell's existing value of r (initially zero); i.e. s and c are derived in the boundary cell which satisfy:

$$-sx_{in} + cr = 0 \quad (4)$$

The parameters s and c subsequently pass unchanged along the first processor row and interact with $x_{12}$ to $x_{14}$ at successive internal cells 16. This has the effect that the transformation which reduced $x_{11}$ to zero is also implemented in respect of $x_{12}$ to $x_{14}$. Since $x_{11}$ to $x_{14}$ are elements of the row vector $\underline{x}^T(t_1)$, this means that the vector's co-ordinate system has been rotated so that its leading element is zero. Moreover, other elements have become transformed to say $x_{12}'$ to $x_{14}'$ for output to second row cells.

In the second processor row, a similar procedure subsequently takes place. The second row boundary cell receives $x_{12}'$, and computes c and s which transform it to zero when combined with the stored element r. The second row internal cells subsequently apply c and s to $x_{13}'$ and $x_{14}'$ to produce $x_{13}''$ and $x_{14}''$ for output to third row cells. In the same way, the third and fourth rows continue this progressive elimination procedure generating respective c and s parameters and updating r at each cell in the process.

The column vector $\underline{y}$ representing successive main antenna signals $y_1, y_2 \ldots$ is input to the right hand processor column containing internal cells only. Each element such as $y_1$ undergoes transformation by the c and s rotation parameters associated with each row in turn as it passes down the right hand column. The multiplier cell 14 accordingly receives input of successive main antenna output signals $y_1$ etc after cumulative rotation by all computed c and s parameters. Moreover, as each element $y_1, y_2 \ldots$ is rotated in each right hand column internal cell, each of these cells updates its stored value r. It can be shown that the stored elements in the right hand column form a vector $\underline{u}$ which is updated every cycle. In effect, each element $y_1$ etc is rotated by a combination of c and s parameters with a corresponding stored element of $\underline{u}$ incorporating contributions from earlier rotation parameters.

The first boundary cell 12 receives an upper diagonal input which is permanently set to 1. It multiplies this by its computed c parameter to generate a diagonal output. The output is received by the second row boundary cell after a delay at 22, and is multiplied by that cell's c parameter. The c parameters generated in successive boundary cells are multiplied together cumulatively in this way to provide a diagonal input to the multiplier cell 14.

Each cell 12, 14 or 16 and the delays 22 are activated by a common system clock (not shown). The clock initiates successive processing cycles (i.e. individual cell operations) at a rate which the slowest cell can follow. On the first cycle of operation illustrated in FIG. 1, $x_{11}$ is input to the top row boundary cell 12. Eight clock cycles after that illustrated, cumulatively multiplied c parameters corresponding to $x_{11}$ to $x_{14}$ will reach the multiplier cell 14. As regards input timing, $y_1$ is delayed by four clock cycles with respect to $x_{11}$. It also has four internal cells to traverse, and will therefore reach multiplier 14 in cumulatively rotated form eight cycles after that illustrated. The rotated equivalent of $y_1$ therefore reaches multiplier 14 in synchronism with the cumulatively multiplied c parameters produced from $x_{11}$ to $x_{14}$ and after rotation by the c and s parameters derived from $x_{11}$ to $x_{14}$. In general, on the $(n+8)$th clock cycle after that illustrated, the multiplier cell 14 receives input of $y_n$ after cumulative rotation by c and s parameters derived from $x_{n1}$ to $x_{n4}$. It also receives input of cumulatively multiplied c parameters derived from $x_{n1}$ to $x_{n4}$.

The multiplier cell 14 multiplies its two inputs together to provide an output $e(t_n)$ given by:

$$e(t_n) = \alpha(n)\gamma(n) \quad (5)$$

where:
$\alpha(n)$ = cumulatively rotated value of $y_n$, and
$\gamma(n)$ = cumulative product of c parameters from $x_{n1}$ to $x_{n4}$.

As proved in detail in British Patent No. 2151378B, and also by McWhirter in Proc. SPIE, Vol. 431, Real Time Signal Processing 1983, the quantity $e(t_n)$ is the residual obtained by forming a linear combination of the elements $x_{n1}$ to $x_{n4}$ and combining this with $y_n$ to produce a minimum. The elements $x_{n1}$ to $x_{n4}$ form $\underline{x}^T(t_n)$, a row vector forming the nth row of the data matrix $\underline{X}$; i.e. the nth set of signals generated by the auxiliary antennas $28x_1$ to $28x_4$. The superscript T indicates the transpose of a conventional column vector. The quantity $e(t_n)$ may therefore be expressed by:

$$e(t_n) = \underline{x}^T(t_n)\underline{w}(n) + y(t_n) \quad (6)$$

where $\underline{w}(n)$ is a weight vector derived from all earlier auxiliary signals $\underline{x}^T(t_1)$ to $\underline{x}^T(t_n)$, and $e(t_n)$ is the least squares residual.

Successive values of $e(t_n)$ form a residual vector $\underline{e}(n)$ given by substituting the data matrix $\underline{X}(n)$ and the main antenna signal column vector $\underline{y}(n)$ in the above equation, and providing $$\underline{e}(n) = \underline{X}(n)\underline{w}(n) + \underline{y}(n) \qquad (7)$$

$\underline{w}(n)$ is chosen to minimize the scalar quantity:ps
$$E(n) = ||\underline{e}(n)|| = ||\underline{X}(n)\underline{w}(n) + \underline{y}(n)|| \qquad (8)$$

In physical terms, $e(t_n)$ is the signal residual obtained from the antenna array 28 by designating a particular antenna 28y as a main or primary antenna, and then applying a combination of gain and phase factors (expressed by $\underline{w}(n)$) to the other or auxiliary antennas $28x_1$ to $28x_4$ so that total output power from the array is minimized. This is particularly useful for an antenna array receiving a signal on one bearing which is adulterated by noise sources on other bearings. Forming the appropriate weighted combination of auxiliary antenna signals and combining it with the main antenna signal to minimize the total signal power corresponds to reducing and hopefully eliminating noise or other unwanted contributions to the main antenna signal. The residual $e(t_n)$ may therefore be considered as the noise-reduced main antenna signal.

The foregoing prior art processor 10 has been shown to be capable of further refinement in British Patent No. 2,143,378(U.S. Pat. No. 4,688,187) and in Advanced Algorithms and Architectures for Signal Processing I, Proc. SPIE, Vol. 696, (1986) pages 80–87. These show that the least squares minimization procedure may be extended to incorporate constraints. In this approach, the weight vector $\underline{w}(n)$ is constrained so that it must satisfy:

$$\underline{s}_i{}^T \underline{w}(n) = \mu_i \, (i=1,2 \ldots N) \qquad (9)$$

where:
$\underline{s}_i$ is the ith of a set of N constraint vectors, and
$\mu_i$ is the ith of a set of N constants.

In the case of radar antenna array processing, the above equation corresponds to signal configuration to maintain constant the array gain in predesignated beam or array "look" directions. By this means, it is possible inter alia to achieve diffraction nulls (zero antenna gain) in the directions of unwanted signal sources. Each $\underline{s}_i$ corresponds to a respective constraint, and collectively they provide multiple simultaneous constraints. They are applied by a preprocessor to antenna signals prior to entry to an equivalent of the processor 10 previously described. In comparison, use of the processor 10 without such a preprocessor is equivalent to use of a single constraint $\underline{s}_i$ having the form $[0,0 \ldots 0,1]^T$; i.e. all elements are zero except the final element.

The foregoing prior art is well suited to processing array output signals subject both to one constraint and to a plurality of simultaneous constraints applied in combination. However, it is unfortunately inefficient for dealing with the problem to which the present invention is directed. This problem is that of computing the Minimum Variance Distortionless Response (MVDR) of an antenna array. It comprises the generation of a respective set of residuals for each of a plurality of constraints applied independently, as opposed to in combination in the prior art. To compute the MVDR on the basis of the prior art requires a respective constraint preprocessor and subsequent processor 10 for each of the plurality of constraints. The application of three constraints would therefore require three preprocessor/processor combinations.

Figure 2:
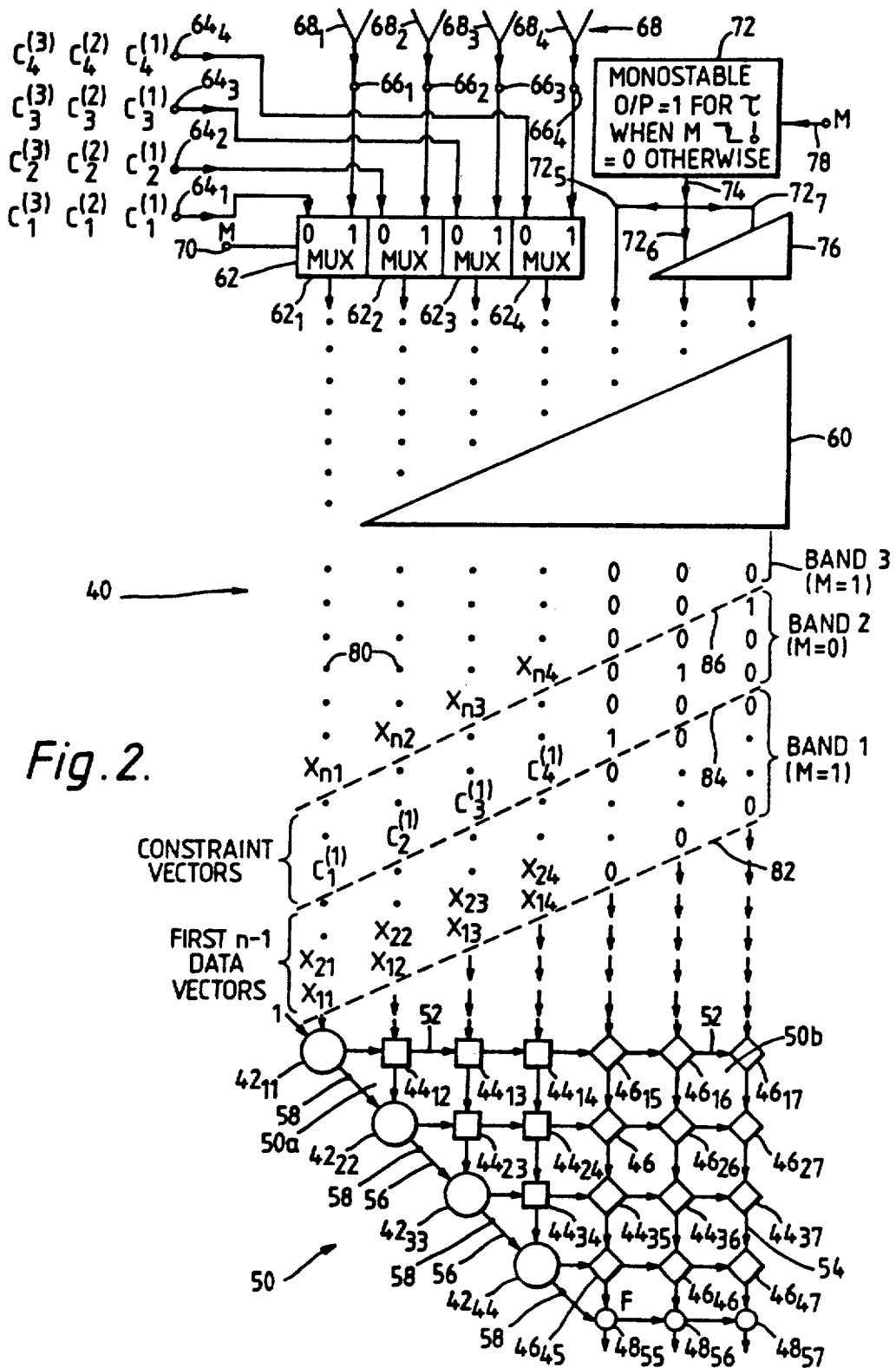
FIGS. 2(a-d) are a schematic functional drawing of a processor of the invention suitable for minimum variance distortionless response computations, FIGS. 3(a-d) and 4(a-d) shows Givens rotation algorithm functions for the processing cells of the FIG. 2 processor, and FIGS. 5(a-d) and 6(a-d) show square root free rotation algorithm functions for the processing cells of the FIG. 2 processor.

Referring to FIG. 2, there is schematically shown a constraint processor 40 of the invention. The processor 40 comprises boundary cells 42, internal cells 44, constraint cells 46 and multiplier cells 48 disposed in a processor array 50 having five rows and seven columns. The array 50 comprises a triangular portion 50a incorporating boundary and internal cells 42 and 44, together with a rectangular portion 50b (constraint processor) consisting of constraint and multiplier cells 46 and 48. The cells 42 to 48 have indices i, j denoting row and column position; e.g. $46_{35}$ is the third row, fifth column constraint cell. The first row begins with a boundary cell $42_{11}$, and continues with three internal cells $44_{12}$ to $44_{14}$ followed by three constraint cells $46_{15}$ to $46_{17}$. The next three rows also begin with respective boundary cells $42_{22}$ to $42_{44}$, but the number of internal cells 44 diminishes by one per row such that the fourth row contains no internal cells. Each of the first four rows contains three constraint cells 46. The fifth row consists of three multiplier cells $48_{55}$ to $48_{57}$.

The processing cells 42 to 48 have nearest neighbor row and column interconnection lines such as 52 and 54. In addition, the boundary cells 42 are connected diagonally in series by lines 56 containing clock-activated delays 58 indicated by dots.

First row cells $42_{11}$, $44_{12}$ to $44_{14}$ and $46_{15}$ to $46_{17}$ receive respective inputs from above with a temporal skew imposed by a delay device indicated by a triangle 60. The device 60 delays input to each first row cell $44_{12}$ to $46_{17}$ by one processing cycle relative to its left hand neighbor $42_{11}$ to $46_{16}$ respectively. This results in a cumulative delay (temporal skew) increasing to the right along the first processor row. The first row boundary and internal cells $42_{11}$ and $44_{12}$ to $44_{14}$ receive respective inputs from the four sections $62_1$ to $62_4$ of a multiplexer 62. The multiplexer sections $62_1$ to $62_4$ have two respective inputs $64_1$ to $64_4$ and $66_1$ to $66_4$. Inputs $64_1$ to $64_4$ are for constraint vector supply, whereas inputs $66_1$ to $66_4$ are connected to respective antennas $68_1$ to $68_4$ of an antenna array 68. The multiplexer 62 has a control input 70 for input of a control bit M = 1 or 0. M = 0 connects constraint vector inputs $64_1$ to $64_4$ to the processor 40. M = 1 connects the antenna array 68 to the processor 40. The antenna array 68 incorporates conventional heterodyne detection and analog to digital conversion apparatus (not shown) to convert antenna signals to in-phase and quadrature values expressed as digital words.

The first row constraint cells $46_{15}$ to $46_{17}$ receive input from respective output channels $72_5$ to $72_7$ of a monostable circuit 72, the channels being connected to a common monostable output 74. Channel $72_5$ is undelayed, but channels $72_6$ and $72_7$ pass via a second delay device 76 providing delays of one and two processing cycles respectively. The monostable 72 has an input 78 for receipt of the control bit M supplied to the multiplexer 62, and is triggered by a negative edge; i.e. when M changes from 1 to 0, the monostable output changes from 0 to 1 and remains at this value for $\tau$, the length of one processing cycle. At all other times, the monostable output is zero.

In addition to items of apparatus previously described, FIG. 2 also illustrates timing of data and constraint vector input to the processor array 50 with a temporal skew increasing to the right. A system clock (not shown) activates successive outputs from the antenna array 68, $x_{ij}$ being the ith output from the jth antenna $68_j$. The antenna outputs are activated in phase, so that the ith outputs from the array 68, i.e. $x_{i1}$ to $x_{i4}$, are produced synchronously. When the control bit M is set to 1, these outputs pass through the multiplexer 62 and down to the processor array 50 as indicated by dots such as 80. The temporal skew imposed by the first delay device 60 is indicated by slanting chain lines 82, 84 and 86. The interval (band 1) between lines 82 and 84 indicates initial data vector input to boundary and internal cells of the processor array 50 with M=1. That between lines 84 and 86 (band 2) corresponds to constraint vector input with M=0. The region above line 86 (band 3) corresponds to subsequent data vector input with M=1 once more. The first row constraint cells $46_{15}$ to $46_{17}$ receive input data values $x=0$ or 1. However, the input $x=1$ only occurs in response to a change in M from 1 to 0 producing a 1 output from the monostable circuit 72. This output is doubly temporally skewed by delay devices 60 and 76, so that input to constraint cell $46_{15}$ leads that to cells $46_{16}$ and $46_{17}$ by two and four processing cycles respectively.

In addition to data or constraint vector input described above, each of the processing cells 42 to 48 receives input of the value of the control bit M corresponding to the relevant input band 1, 2 or 3. Input of M is not illustrated to reduce the complexity of FIG. 2.

The processing functions of each of the cells 42 to 48 are illustrated in FIG. 3, in which parts previously described are like-referenced. Each boundary cell 42 receives input data and control bit values $x_{in}$ and M from above, together with $y_{in}$ from above left. It has two differing sets of processing functions, the function being selected according to whether M=1 or 0. For M=1, this involves computation of an updated value $r'$ for the boundary cell's stored matrix element $r$; $c$ and $s$ or cosine and sine rotation parameters are then computed from $r'$, $r$ and $x_{in}$ for output horizontally to the right. Finally, $y_{in}$ is multiplied by c to produce $y_{out}$ for output below and to the right. This is expressed by:

$$M = 1: r' \leftarrow [\beta^2 r^2 + |x_{in}|^2]^{\frac{1}{2}} \quad (10.1)$$

If $x_{in} = 0$, then $c \leftarrow 1$ and $s \leftarrow 0$. (10.2)

If $x_{in} \neq 0$, then $c \leftarrow \beta r/r'$ and $s \leftarrow x_{in}/r'$. (10.3)

For all $x_{in}$, $r \leftarrow r'$ and $y_{out} \leftarrow cy_{in}$, the latter providing for cumulative multiplication of c or cosine rotation parameters in cascade along the diagonally connected boundary cells 42. The parameter $\beta$ is a constant having a value between 0 and 1. Its effect is to introduce a "forget" factor providing for earlier data to be given progressively lower weight; for M=0, the boundary cell function consists of:

$$c \leftarrow 1, s \leftarrow x_{in}/r \text{ and } y_{out} \leftarrow y_{in} \quad (10.4)$$

The major difference introduced by the change from M=1 to 0 is that the boundary cell's stored parameter r is not updated.

Each internal cell 44 receives $x_{in}$ and M from above together with c and s from the left. It computes $x_{out}$, passes c and s horizontally to its right and passes M and $x_{out}$ vertically downwards. Here again the processing function depends on the value of M as follows:

$$M = 1: x_{out} \leftarrow cx_{in} - s\beta r \quad (11.1)$$

$$r \leftarrow s^* x_{in} + c\beta r \text{ (s* = complex conjugate of s)} \quad (11.2)$$

$$M = 0: x_{out} \leftarrow x_{in} - sr \quad (11.3)$$

As before, the internal cell updates its stored value of r when M=1 but not when M=0.

Each constraint cell 46 receives c and s parameters from its left together with $x_{in}$, $\lambda_{in}$ and M from above. Of these, input of $\lambda_{in}$ and M is not illustrated to reduce drawing complexity. When M=1, each constraint cell 46 computes $x_{out}$ and $\lambda_{out}$, and updates its stored element a. The input c and s parameters are passed on to the right, and $x_{out}$, $\lambda_{out}$ and M are output vertically below. The processing cell function depends on M as before, and is given by:

$$M=1: x_{out} \leftarrow cx_{in} - s\beta a \quad (12.1)$$

$$a \leftarrow s^* x_{in}/\beta^2 + ca/\beta \quad (12.2)$$

$$\lambda_{out} \leftarrow \lambda_{in} + |a|^2 \quad (12.3)$$

$$M=0: x_{out} \leftarrow x_{in}; \lambda_{out} \leftarrow \lambda_{in} \quad (12.4)$$

if $x_{in}=1$ (but not otherwise) then $a \leftarrow s^*$. (12.5)

The change to M=0 results in $x_{in}$ and $\lambda_{in}$ being passed on unaltered as $x_{out}$ and $\lambda_{out}$. This means that $\lambda_{in}$ and $\lambda_{out}$ are zero, since uppermost constraint cells $46_{15}$ to $46_{17}$ receive zero $\lambda_{in}$ values. In addition, the stored element a is not updated unless $x_{in}=1$, in which case it becomes the complex conjugate of s (i.e. s*).

Each multiplier cell 48 receives $x_{in}$, $\lambda_{in}$ and M from above together with $\gamma$ from the left. It passes on $\gamma$ unchanged to its right, and, when M=1, computes $x_{out}$ as follows:

$$M=1: \text{If } \lambda_{in}=0, \text{ then } x_{out} \leftarrow 0 \quad (13.1)$$

$$\text{If } \lambda_{in} \neq 0, x_{out} \leftarrow \gamma x_{in}\mu/\beta^2 \lambda_{in} \quad (13.2)$$

Here $\mu$ is an amplification factor which may (optionally) be different for differing multiplier cells 48. If M=0, $x_{out}$ is 0, i.e. $x_{out} \leftarrow 0$.

The processor 40 operates as follows. When M=1, the triangular portion 50a of the array 50 operates in a similar manner to the first four columns of the prior art processor 10 shown in FIG. 1. However, unlike the processor 10, there is no column of internal cells for processing main antenna signals with rotation parameters derived from auxiliary antenna signals. All antennas $68_1$ to $68_4$ in the array 68 are equivalent, and in contrast to the prior art there is no requirement to predesignate one antenna as a main antenna and the rest of the array as auxiliaries.

The cells 42 to 48, intercell delays 58 and delay devices 60 and 76 are activated by the system clock (not shown) employed to clock signals from the antenna array 68 as previously mentioned. The clock operates at a rate which is sufficiently slow to accommodate operation of the slowest device it controls, and has a clock cycle interval or period of $\tau$. Clocking arrangements are well known in the art of systolic arrays, and will not be described further.

The processor 40 has three differing phases of operation corresponding to data bands 1, 2 and 3 in FIG. 2. The first phase, band 1, is a first initialization period during which M=1 and the first (n−1) data vectors are input to the top row of the triangular portion 50a of the processor array 50. The first data vector $\underline{x}^T(t_1)$ has elements $x_{11}$, $x_{12}$, $x_{13}$ and $x_{14}$. It represents the first signals synchronously output at time $t_1$ from the antennas $68_1$ to $68_4$ respectively and subsequently temporally skewed. It also represents the first row of an initial data matrix $\underline{X}(n-1)$ consisting of the first (n−1) data vectors and having ith row elements $x_{i1}$ to $x_{i4}$ (i=1 to n−1).

The triangular processor portion or sub-array 50a implements a QR decomposition of the initial data matrix $\underline{X}(n-1)$, as described earlier for the FIG. 1 processor 10. This provides each boundary cell 42 and internal cell 44 with a respective stored element r (initially zero). The elements r are elements of the triangular matrix $\underline{R}(n-1)$ arising from QR decomposition or triangularization of $\underline{X}(n-1)$.

The rectangular or constraint sub-array 50b of constraint and multiplier cells 46 and 48 is effectively inactive during the first processing phase (band 1). This is because each constraint cell's stored element a is initially and remains zero, and $x_{in}$ is also zero for these cells in band 1. Accordingly $x_{out}=cx_{in}-s\beta a$ is zero irrespective of c and s. Moreover, the top row constraint cells $46_{15}$ to $46_{17}$ have a $\lambda_{in}$ input (not shown) permanently set to zero. Since a is also zero, $\lambda_{out}=\lambda_{in}+|a|^2$ is also zero. Finally, the multiplier cells $48_{55}$ to $48_{57}$ are arranged to produce zero values of $x_{out}$ when $\lambda_{in}=0$.

The second phase of processing (band 2, M=0) is a second or constraint initialization period. It involves input of successive constraint vectors to the triangular sub-array 50a as simulated input data vectors. When the control bit M is switched from 1 to 0, the multiplexer 62 switches its outputs to 0-selected inputs $64_1$ to $64_4$ arranged to receive the constraint vectors in succession. The elements of each vector are input in parallel, $c_i^{(k)}$ (i=1 to 4, k=1 to 3) being the ith element of the kth constraint vector $\underline{c}^{(k)}$. Since M=0, each boundary cell 42 and internal cell 44 operates in its second mode (see FIG. 4), in which its respective stored element r is not updated. The boundary cells 42 output $y_{out}=y_{in}$, c=1 and s=$x_{in}$/r. Here r is the element computed and updated up to (but not after) the point when M changed from 1 to 0, and $x_{in}$ corresponds to successive constraint vector elements $c_i^{(k)}$ or their rotated equivalents for cells 42 and 44 in the second to fourth rows.

Since the stored elements r are not updated when M=0, the triangular sub-array 50a is in effect processing the constraint vectors $\underline{c}^{(k)}$ (k=1, 2 or 3) with the matrix $\underline{R}(n-1)$ obtained from QR decomposition of the first (n−1) data vectors. It can be shown that the effect of inputting an arbitrary vector $\underline{c}$ to the sub-array 50a under these conditions is to produce a transformed vector $\underline{a}(n-1)$ given by:

$$\underline{a}(n-1)=\underline{R}^{-T}(n-1)\underline{c} \quad (14)$$

where $\underline{R}^{-T}(n-1)$ is the transpose of the inverse of $\underline{R}(n-1)$.

In consequence, input of the kth constraint vector $\underline{c}^{(k)}$ (k=1 to 3) to the triangular sub-array 50a produces a corresponding kth transformed vector $\underline{a}^{(k)}(n-1)$. This has a qth element $a_q^{(k)}(n-1)$ (q=1 to 4), which is evaluated as an s rotation parameter by the qth boundary cell $42_{qq}$. The first boundary cell $42_{11}$ evaluates the first elements $a_1^{(1)}(n-1)$ to $a_1^{(3)}(n-1)$ of successive transformed vectors on successive processing cycles from input constraint vector leading elements $c_1^{(1)}$ to $c_1^{(3)}$. The second boundary cell produces $a_2^{(1)}(n-1)$ to $a_2^{(3)}(n-1)$ in succession from $c_2^{(1)}$ to $c_2^{(3)}$ after rotation at internal cell $44_{12}$ and so on. Because of the temporal skew governing constraint vector input to the sub-array 50a, a like-temporal skew applies to the kth transformed vector $\underline{a}^{(k)}(n-1)$. The qth element $a_q^{(k)}$ (q=1 to 4) of this vector is output horizontally from the qth cell of the fourth column of the array 50, i.e. the last column of the sub-array 50a. Consequently, the rectangular constraint/multiplier cell sub-array 50b receives successive transformed vectors $\underline{a}^{(1)}(n-1)$ to $\underline{a}^{(3)}(n-1)$. Each vector has elements in parallel and temporally skewed, and each element is an s (sine) rotation parameter evaluated by a boundary cell 42 from an input constraint vector element (cell $42_{11}$) or from the equivalent rotated at one or more internal cells 44 (boundary cells $42_{22}$ to $42_{44}$).

The first or upper left constraint cell $46_{15}$ receives the s parameter or transformed vector element $a_1^{(1)}(n-1)$ four processing cycles after input of the first constraint vector element $c_1^{(1)}$ to boundary cell $42_{11}$. At the same time, the constraint cell $46_{15}$ receives $x_{in}=1$ from the monostable 72 after delay of four cycles at the delay device 60. Because $x_{in}=1$ and processor operation is in mode 2 (band 2, M=0), the cell $46_{15}$ computes the complex conjugate $a_1^{(1)*}(n-1)$ of the input s parameter (see FIG. 3). It updates its stored element a by changing it to this s parameter conjugate. Other constraint cells $46_{16}$ to $46_{47}$ are still receiving $x_{in}=0$, so their stored elements a remain at zero. One processing cycle later, cell $46_{15}$ receives $x_{in}=0$ once more, and therefore its stored element a is not updated further. However, it has output its preceding value of $x_{in}=1$ (and $\lambda_{in}=0$) to cell $46_{25}$ immediately below, which is receiving input of $a_2^{(1)}(n-1)$, the second element of the first transformed vector. The cell $46_{25}$ consequently updates its stored value a from zero to $a_2^{(1)*}(n-1)$, while all other constraint cells $46_{15}$ to $46_{17}$ and $46_{26}$ to $46_{47}$ remain with zero values of a, $x_{in}$ and $x_{out}$. On the following processing cycle, $x_{in}$ becomes 1 for constraint cells $46_{35}$ and $46_{16}$. In the latter case, it is because the monostable output of 1 has reached cell $46_{16}$ after a one cycle delay at 76 and a five cycle delay at 60. As regards cell $46_{35}$, it is because $x_{out}$ from cell $46_{25}$ is 1. Simultaneously with receiving $x_{in}=1$, cell $46_{16}$ receives $a_1^{(2)}(n-1)$, the first element of the second transformed vector $\underline{a}^{(2)}(n-1)$ and derived from the first element $c_1^{(2)}$ of the second constraint vector $\underline{c}^{(2)}$. Cell $46_{35}$ receives $a_3^{(1)}(n-1)$, the third element of the first transformed vector $\underline{a}^{(1)}(n-1)$ derived from the first constraint vector's third element $c_3^{(1)}$. Consequently, cell $46_{16}$ updates its stored element a to $a_1^{(2)*}(n-1)$ and cell $46_{35}$ updates its stored element a to $a_3^{(1)*}(n-1)$.

Two processing cycles later, $x_{in}=1$ reaches the left hand multiplier cell $48_{55}$ having produced a stored element update to $a_4^{(1)*}(n-1)$ at constraint cell $46_{45}$ on the way. However, M=0, so the multiplier cell $48_{55}$ outputs 0. Simultaneously, the top right hand constraint cell $46_{17}$ receives input of $x_{in}=1$ from the monostable 72 via a total of eight processing cycles' delay at devices 60 and 76. Its left hand input at this time is the s parameter derived from $c_1^{(3)}$, the leading element of the third and final constraint vector. The cell $46_{17}$ accordingly stores $a_1^{(3)*}(n-1)$.

Extending the above analysis shows that a respective stored element $a=a_p^{(q)*}(n-1)$ replaces zero in (and thereby initializes) the general constraint cell $46_{p,q+4}$ (p=1 to 4, q=1 to 3) (q+3) processing cycles after the corresponding constraint element $c_p^{(q)}$ was input to the triangular sub-array 50a. This is (n+p+2q) processing cycles after that illustrated in FIG. 2. Since the cycle number (n+p+2q) involves p and q, the constraint cells are not all initialized simultaneously. Instead, what might be termed a wavefront of initialization passes through the constraint cells 46 with double temporal skew. Cells such as 46₃₅ (p=3, q=1) and 46₁₆ (p=1, q=2) for which (p+2q) has the same value are initialized in synchronism.

When any one of the constraint cells 46 has been initialized, it is ready to begin processing. Each column of constraint cells has become initialized to contain a respective complex conjugate transformed vector. Immediately following throughput of the constraint vectors $\underline{c}^{(1)}$ to $\underline{c}^{(3)}$, further data vectors $\underline{x}^T(t_n)$ etc. are input to the triangular sub-array 50a (band 3 data input). M becomes equal to 1, and top row constraint cells 46₁₅ to 46₁₇ receive $x_{in}=0$. As in band 1, the triangular sub-array 50a computes new rotation parameters from successive input data vectors. The rotation parameters are passed to the constraint sub-array 50b, which now holds non-zero stored values of the kind $a=a_p^{(q)*}(n-1)$ on constraint cell 46$_{p,q+4}$ (p=1 to 4, q=1 to 3). Despite $x_{in}$ being zero in band 3 (as in band 1), the effect of storage of non-zero values of a in the constraint sub-array 50b is to render it no longer quiescent. This can be appreciated from FIG. 3, in which the constraint cell function for M=1 is:

$$x_{out} \leftarrow cx_{in} - s\beta a \quad (15.1)$$

$$a \leftarrow s^* x_{in}/\beta^2 + ca\beta \quad (15.2)$$

$$\lambda_{out} \leftarrow \lambda_{in} + |a|^2 \quad (15.3)$$

The above expression for $x_{out}$ is equivalent to the corresponding expression for internal cells 44 ($x_{out}=cx_{in}-s\beta r$) except that a replaces r. The stored element a is rotated with the rotation parameters c and s for the purposes of updating, and the "forget factor" $\beta$ is introduced in such a way that its overall effect on the subsequent (next processing cycle) value of $x_{out}$ is nullified. In other words, the factor $\beta$ is introduced in the triangular sub-array 50b to weight stored r values in favour of more recent data, but it is not allowed to produce a similar effect on the operation of constraint cells 46. In this way, the effect of band 2 initialization of the constraint cells 46 is preserved. The net effect of this is that the stored element a in each constraint cell 46 undergoes rotation for the purposes of updating and subsequent storage as though it were an extra element of a respective input data vector or a rotated equivalent.

During band 3 data input, the uppermost constraint cell 46$_{1,q+4}$ (q=1, 2 or 3) of each column of constraint cells receives input of $x_{in}=0$. In the prior art processor 10 of FIG. 1, the corresponding fourth column of internal cells received successive input values y₁, y₂ etc. These were rotated with respective stored values of r and input c and s parameters to produce residuals. In the processor 40 of the invention, an analogous procedure takes place. However, the equivalents of inputs y₁ etc. are all zero. In addition, the prior art stored values r in the fourth column are instead $a_p^{(q)*}(n-1)$ or subsequent equivalents updated by rotation with successive c and s parameters derived from successive input data vectors $\underline{x}^T(t_n)$ etc. Consequently, the operation of a column of constraint cells (e.g. cells 46₁₅ to 46₄₅) is to rotate a zero input with successive sets of rotation parameters and successive constraint factors obtained by transforming a constraint vector. The output $x_{out}$ from a lowermost constraint cell (e.g. 46₄₅) is therefore the result obtained by cumulatively rotating a zero input to the corresponding uppermost cell 46₁₅ at four successive constraint cells incorporating transformed constraint factors of the kind $a_p^{(1)*}(n-1)$ (p=1 to 4).

The result of this cumulative rotation procedure passes as $x_{out}$ from constraint cell 46₄₅ to provide $x_{in}$ to the first multiplier cell 48₅₅. In addition, each constraint cell computes $\lambda_{out}=\lambda_{in}+|a|^2$, where $\lambda_{in}$ to the uppermost constraint cell is zero. This function accordingly sums the squares of the constraint factors computed at constraint cells in a column on the preceding four processing cycles.

The multiplier cell 48₅₅ also receives an input $\gamma$, this being the result of cumulatively multiplying c parameters computed on the boundary 42₁₁ to 42₄₄ 8, 6, 4 and 2 processing cycles earlier respectively. This cell then computes:

$$x_{out} = -\gamma x_{in} \mu^{(1)}/\beta^2 \lambda_{in} \quad (16)$$

As has been said, $\mu^{(1)}$ is simply an amplification factor and $\beta$ is a "forget" factor. However, the timing of operation of the array 50 is such that each of the remaining terms on the right hand side of the above expression is derived from the same input data vector. For example, the elements $x_{n1}$ to $x_{n4}$ of the first band 3 data vector $\underline{x}^T(t_n)$ output at time $t_n$ from the antenna aray 68 are employed by boundary cells 42 to compute four sets of c and s rotation parameters. In the first constraint column (cells 46₁₅ to 46₅₅), these parameters are employed in successive cells to effect cumulative rotation of a zero input to the uppermost cell with incorporation of each cell's stored value $a_p^{(1)*}(n-1)$ (p=1 to 4). The c and s parameters are subsequently employed by each cell to rotate its stored value and thereby update it to $a_p^{(1)*}(n)$. The squares of the moduli of these updated values, i.e. $\| a_p^{(1)*}(n) \|^2$ are summed to produce $\lambda_{in}$ for the multiplier cell 48₅₅. The boundary cells 42₁₁ to 42₄₄ produce along their diagonal connections the product of c rotation parameters derived from $\underline{x}^T(t_n)$ to produce $\gamma$ for the multiplier cell 48₅₅. The inputs to the multiplier cell 48₅₅ may therefore be written:

$$\gamma = \gamma(t_n) = \text{product of } c \text{ parameters from } \underline{x}^T(t_n), \quad (17)$$

$$x_{in} = a^{(1)}(t_n) = \text{cumulative rotation of zero with } c \text{ and } s \quad (18)$$
$$\text{parameters derived from } \underline{x}^T(t_n) \text{ and}$$
$$a_1^{(1)*}(n-1) \text{ to } a_4^{(1)*}(n-1),$$
$$\text{at constraint cells } 46_{15} \text{ to } 46_{45}.$$

$$\lambda_{in} = \sum_{i=1}^{4} |a_i^{(1)*}(n)|^2 \quad (19)$$

The above expression for $\lambda_{in}$ is the sum of the squared moduli of the individual elements of the complex conjugate vector $\underline{a}^{(1)*}(n)$, and therefore can be written:

$$\lambda_{in} = \| \underline{a}^{(1)*}(n) \|^2 \quad (20)$$

Let the output $x_{out}$ of the first or left hand multiplier cell 48₅₅ derived from $\underline{x}(t_n)$ be $x_{out}^{(1)}(t_n)$.

Combining the preceding equations, it may be written:

$$x_{out}{}^{(1)}(t_n) = -\mu^{(1)}\gamma(t_n)a^{(1)}(t_n)/\beta^2[\,\|\underline{a}^{(1)*}(n)\|^2\,] \quad (21)$$

$x_{out}{}^{(1)}(t_n)$ is output from the first multiplier cell $48_{55}$ nine processing cycles after input of $x_{n1}$ to the first boundary cell $42_{11}$. After traversing the fifth column of cells $46_{15}$ to $46_{45}$ and $48_{55}$, the c and s parameters and $\gamma(t_n)$ pass horizontally unchanged to the sixth column ($46_{16}$ to $46_{46}$, $48_{56}$) and subsequently to the seventh column ($46_{17}$ to $46_{47}$, $48_{57}$). The sixth column is associated with the transformed conjugate constraint vector $\underline{a}^{(2)*}(n-1)$ and multiplier cell gain factor $\mu^{(2)}$ and output $x_{out}{}^{(2)}(t_n)$.

The equivalents for the seventh column are $\underline{a}^{(3)*}(n-1)$, $\mu^{(3)}$ and $x_{out}{}^{(3)}(t_n)$.

Here again, each column cumulatively rotates a zero input to its uppermost constraint cell $46_{16}/46_{17}$ with rotation parameters and stored constraint elements. Consequently, one and two processing cycles respectively after $x_{out}{}^{(1)}(t_n)$ appears at the output of the first multiplier cell $48_{55}$, the second and third multiplier cells $48_{56}$ and $48_{57}$ produce outputs $x_{out}{}^{(2)}(t_n)$ and $x_{out}{}^{(3)}(t_n)$ given by:

$$x_{out}{}^{(2)}(t_n) = -\mu^{(2)}\gamma(t_n)a^{(2)}(t_n)/\beta^2[\,\|\underline{a}^{(2)*}(n)\|^2\,] \quad (22)$$

$$x_{out}{}^{(3)}(t_n) = -\mu^{(3)}\gamma(t_n)a^{(3)}(t_n)/\beta^2[\,\|\underline{a}^{(3)*}(n)\|^2\,] \quad (23)$$

While $x_{out}{}^{(2)}$ is being computed in the sixth column, the fifth column is receiving input parameters derived from a subsequent data vector $\underline{x}^T(t_{n+1})$. Similarly, while $x_{out}{}^{(3)}$ is being computed in the seventh column, the fifth column is receiving inputs derived from $\underline{x}^T(t_{n+2})$ and the sixth column inputs derived from $\underline{x}^T(t_{n+1})$. The inputs are of course temporally skewed as has been indicated. Strictly speaking, it should be noted that the sixth and seventh columns have begun to operate with inputs derived from $\underline{x}^T(t_n)$ before the fifth column has finished with such inputs. However, temporally skewed operation is well understood in the art of systolic arrays, and will not be described in detail.

Consequently, when $x_{out}{}^{(3)}(t_n)$ appears at the output of the last column multiplier cell $48_{57}$, the outputs of the first and second multiplier cells $48_{55}$ and $46_{56}$ at this time are given by:

$$x_{out}{}^{(1)}(t_{n+2}) = -\mu^{(1)}\gamma(t_{n+2})a^{(1)}(t_{n+2})/\beta^2 \\ [\,\|\underline{a}^{(1)*}(n+2)\|^2\,] \quad (24)$$

and $$x_{out}{}^{(2)}(t_{n+1}) = -\mu^{(2)}\gamma(t_{n+1})a^{(2)}(t_{n+1})/\beta^2 \\ [\,\|\underline{a}^{(2)*}(n+1)\|^2\,] \quad (25)$$

Extending this analysis, the output $x_{out}{}^{(k)}(t_{n+i})$ ($i = 0, 1, \ldots$) of the kth multiplier cell $48_{5,k+4}$ ($k = 1$ to $3$) derived from the $(i+1)$th band 3 data vector $\underline{x}^T(t_{n+i})$ is given by:

$$x_{out}{}^{(k)}(t_{n+i}) = -\mu^{(k)}\gamma(t_{n+i})a^{(k)}(t_{n+i})/\beta^2[\,\|\underline{a}^{(k)*}(n+i)\|^2\,] \quad (26)$$

This output appears $(8+k+i)$ processing cycles after input of the leading element $x_{n1}$ of the first band 3 data vector $\underline{x}^T(t_n)$ to the first boundary cell $42_{11}$. Since $\underline{x}^T(t_n)$ is preceded by $(n-1)$ data vectors and three constraint vectors, this corresponds to $(10+n+k+i)$ cycles after $x_{11}$ input.

It remains to prove that the quantities $x_{out}{}^{(k)}(t_{n+i})$, computed as described above, are precisely the residuals $e^{(k)}(t_{n+i})$ defined in Equation (1). To reduce notation complexity, we shall write i ($i = n, n+1, \ldots,$) for $n+i$.

The solution for the weight vector $\underline{w}^{(k)}(i)$ when the $L_2$ norm of $\underline{B}(i)\underline{X}(i)\underline{w}^{(k)}(i)$ is minimised subject to the constraint, Equation (2), is $$\underline{w}^{(k)}(i) = \mu^{(k)}\underline{M}^{-1}(i)\underline{c}^{(k)*}/\underline{c}^{(k)T}\underline{M}^{-1}(i)\underline{c}^{(k)*} \quad (28)$$

(see J. E. Hudson, "Adaptive Array Principles", Peter Peregrinus Ltd., 1981).

Here $\underline{B}(i)$ is the matrix $$\underline{B}(i) = \text{diag}\{\beta^{i-1}, \beta^{i-2}, \ldots, 1\} \quad (29)$$

which introduces data deweighting or "forgetting" of past data. $\underline{M}(i)$ is the estimator of the weighted data invariance matrix, given here by $$\underline{M}(i) = \underline{X}^H(i)\underline{B}^2(i)\underline{X}(i) \quad (30)$$

where $\underline{X}^H(i)$ denotes the hermitian conjugate of the matrix $\underline{X}(i)$.

A QR decomposition is carried out on the weighted data matrix, $\underline{B}(i)\underline{X}(i)$, so that $$\underline{Q}(i)\underline{B}(i)\underline{X}(i) = \begin{bmatrix} \underline{R}(i) \\ 0 \end{bmatrix} \quad (31)$$

where $\underline{R}(i)$ is, in the foregoing embodiment of the invention, a $4 \times 4$ upper triangular matrix (more generally an $m \times m$ upper triangular matrix, where m is the number of input channels for data $x_j(i) = x_{ij}$). Since $\underline{Q}(i)$ is a unitary rotation matrix, it follows that:

$$\underline{M}(i) = \underline{R}^H(i)\underline{R}(i) \quad (32)$$

and $\underline{R}(i)$ is known as the Cholesky square root of the covariance matrix $\underline{M}(i)$. Equation (28) may then be written $$\underline{w}^{(k)}(i) = \mu^{(k)}\underline{R}^{-1}(i)\underline{R}^{-H}(i)\underline{c}^{(k)*}/\underline{c}^{(k)T}\underline{R}^{-1}(i)\underline{R}^{-H}(i)\underline{c}^{(k)*}$$

or $$= \mu^{(k)}\underline{R}^{-1}(i)\underline{a}^{(k)}(i)/\|\underline{a}^{(k)}(i)\|^2 \quad (33)$$

where the notation $\underline{R}^{-H}(i)$ denotes the inverse of the hermitian conjugate of the matrix $\underline{R}(i)$, and the vector $\underline{a}^{(k)}(i)$ is defined as $$\underline{a}^{(k)}(i) = \underline{R}^{-H}(i)\underline{c}^{(k)*} \quad (34)$$

It follows from Equation (34) that the residual in Equation (1) is given by:

$$e^{(k)}(t_i) = \mu^{(k)}\hat{e}^{(k)}(t_i)/\|\underline{a}^{(k)}(i)\|^2 \quad (35)$$

where $$\hat{e}^{(k)}(t_i) = \underline{b}^T(i)\underline{a}^{(k)}(i) \quad (36)$$

and $$\underline{b}(i) = \underline{R}^{-T}(i)\underline{x}(t_i) \quad (37)$$

In Proc. SPIE Vol 298, Real Time Signal Processing IV (1981), Gentleman and Kung describe QR decomposition of $\underline{B}(i)\underline{X}(i)$ recursively on a triangular systolic array equivalent to sub-array 50a. In full matrix terms, the triangular matrix $\underline{R}(i-1)$ is updated using a unitary transformation matrix $\hat{Q}(i)$ as follows $$\hat{Q}(i) \begin{bmatrix} \beta \underline{R}(i-1) \\ 0 \\ \underline{x}^T(t_i) \end{bmatrix} = \begin{bmatrix} \underline{R}(i) \\ 0 \\ 0 \end{bmatrix} \quad (38)$$

where both $\underline{R}(i-1)$ and $\underline{R}(i)$ are $m \times m$ upper triangular matrices. Therefore, the matrix $\hat{Q}(i)$ rotates the most recent data vector $\underline{x}^T(t_i)$ into the matrix $\underline{R}(i-1)$, scaled by the forget factor $\beta$, to produce the most recent triangular matrix $\underline{R}(i)$. $\underline{R}(i)$ is the matrix produced by the QR decomposition of $\underline{B}(i)\underline{X}(i)$. $\underline{R}(i-1)$ is the corresponding triangular matrix produced by the QR decomposition of $\underline{B}(i-1)\underline{X}(i-1)$. $\hat{Q}(i)$ represents a sequence of elementary Givens rotations used to annihilate each element in turn of the vector $\underline{x}^T(t_i)$. J. G. McWhirter, in Proc. SPIE, Vol 431, Real Time Signal Processing VI (1983), shows that the matrix $\hat{Q}(i)$ may be expressed in partitioned form by:

$$\hat{Q}(i) = \begin{bmatrix} \underline{A}(i) & 0 & \underline{\Phi}(i) \\ 0 & I & 0 \\ \underline{\psi}^T(i) & 0 & \gamma(t_i) \end{bmatrix} \quad (39)$$

where $\underline{A}(i)$ is an $m \times m$ (lower triangular) matrix, $\underline{\Phi}(i)$ and $\underline{\psi}(i)$ are $m \times 1$ vectors, $I$ is a unit matrix, and $\gamma(t_i)$ is a real scalar. Schreiber has shown how to update the vector $\underline{a}^{(k)}(i)$ in IEEE Trans. ASSP-34, No. 5 1038 (1986). In the context of QR decomposition, this update may be derived as follows. From Equation (34) it is clear that at time $i-1$:

$$\begin{aligned} \underline{c}^{(k)*} &= \underline{R}^H(i-1) \underline{a}^{(k)}(i-1) \\ &= \beta^{-2} [\beta \underline{R}^H(i-1) \; 0 \; \underline{x}^*(t_i)] \begin{bmatrix} \beta \underline{a}^{(k)}(i-1) \\ \beta \underline{v}^{(k)}(i-1) \\ 0 \end{bmatrix} \end{aligned} \quad (40)$$

where $\underline{v}^{(k)}(i-1)$ is an arbitrary $i-m-1$ element vector. Now, since $\hat{Q}(i)$ is unitary, Equation (40) may be written:

$$\underline{c}^{(k)*} = \beta^{-2} [\beta \underline{R}^H(i-1) \; 0 \; \underline{x}^*(t_i)] \hat{Q}^H(i)\hat{Q}(i) \begin{bmatrix} \beta \underline{a}^{(k)}(i-1) \\ \beta \underline{v}^{(k)}(i-1) \\ 0 \end{bmatrix} \quad (41)$$

and thus it follows from Equation (35) that $$\underline{c}^{(k)*} = \beta^{-2} [\underline{R}^H(i) \; 0 \; 0] \hat{Q}(i) \begin{bmatrix} \beta \underline{a}^{(k)}(i-1) \\ \beta \underline{v}^{(k)}(i-1) \\ 0 \end{bmatrix} \quad (42)$$

Using the structure of $\hat{Q}(i)$ partitioned as in Equation (39), we may write $$\hat{Q}(i) \begin{bmatrix} \beta \underline{a}^{(k)}(i-1) \\ \beta \underline{v}^{(k)}(i-1) \\ 0 \end{bmatrix} = \begin{bmatrix} \underline{d}^{(k)}(i) \\ \beta \underline{v}^{(k)}(i-1) \\ \alpha^{(k)}(t_i) \end{bmatrix} \quad (43)$$

(where $\underline{d}^{(k)}(i)$ is an $m \times 1$ vector), and so from Equations (42) and (43) we obtain:

$$\underline{c}^{(k)*} = \beta^{-2} \underline{R}^H(i) \underline{d}^{(k)}(i) \quad (44)$$

It follows from the definition in Equation (34) that $$\underline{d}^{(k)}(i) = \beta^2 \underline{a}^{(k)}(i) \quad (45)$$

and hence Equation (43) constitutes a recursion which may be used to compute the updated vector $\underline{a}^{(k)}(i)$ from the old vector $\underline{a}^{(k)}(i-1)$, together with the collection of elementary Givens rotations represented by the unitary matrix $\hat{Q}(i)$.

The recursive update in Equation (43) is implemented in accordance with the invention by an extension to the triangular array proposed by Gentleman and Kung.

The application of the matrix $\hat{Q}(i)$ to the vector $\beta \underline{a}^{(k)}(i-1)$ as required in Equation (43) is performed by first storing the vector $\underline{a}^{(k)}(i-1)$ in a column of m cells to the right of the $(m \times m)$ Gentleman-Kung triangular array, and performing the QR decomposition of the incoming data matrix. The elements of $\underline{a}^{(k)}(i-1)$ are each multiplied by $\beta$ and the result rotated by incoming sine and cosine (or sine-like and cosine-like) parameters passed along each row of the triangular array. According to Equation (45), this produces a new vector, $\beta^2 \underline{a}^{(k)}(i)$, and the scalar quantity $\alpha^{(k)}(t_i)$ in Equation (43) is passed out of the bottom cell of the kth constraint column. The elements of $\beta^2 \underline{a}^{(k)}(i)$ in the kth constraint column are then divided by $\beta^2$ before storage and application of the next rotation. Different elements of $\underline{a}^{(k)}(i)$ are not updated simultaneously when the array is operated in systolic mode. Adjacent elements of $\underline{a}^{(k)}(i)$ are updated in successive clock cycles in the fashion well-documented in the prior art.

Having updated $\underline{a}^{(k)}(i)$, the least squares residual $e^{(k)}(t_i)$ may be derived as follows. Multiplying both sides of Equation (38) by $\hat{Q}^H(i)$, and using the unitary properties of $\hat{Q}(i)$ gives:

$$\begin{bmatrix} \beta \underline{R}(i-1) \\ 0 \\ \underline{x}^T(t_i) \end{bmatrix} = \begin{bmatrix} \underline{A}^H(i) & 0 & \underline{\psi}^*(i) \\ 0 & I & 0 \\ \underline{\Phi}^H(i) & 0 & \gamma(t_i) \end{bmatrix} \begin{bmatrix} \underline{R}(i) \\ 0 \\ 0 \end{bmatrix} \quad (46)$$

from which the bottom row gives:

$$\underline{R}^T(i) \underline{\Phi}^*(i) = \underline{x}(t_i) \quad (47)$$

By comparing Equations (37) and (47), we may make the following identification, $$\underline{b}(i) = \underline{\Phi}^*(i) \quad (48)$$

Similarly, by multiplying both sides of Equation (43) by $\hat{Q}^H(i)$, and using Equation (45), $$\begin{bmatrix} \beta \underline{a}^{(k)}(i-1) \\ \beta \underline{v}^{(k)}(i-1) \\ 0 \end{bmatrix} = \begin{bmatrix} \underline{A}^H(i) & 0 & \underline{\psi}^*(i) \\ 0 & I & 0 \\ \underline{\Phi}^H(i) & 0 & \gamma(t_i) \end{bmatrix} \begin{bmatrix} \beta^2 \underline{a}^{(k)}(i) \\ \beta \underline{v}^{(k)}(i-1) \\ \alpha^{(k)}(t_i) \end{bmatrix} \quad (50)$$

from which the bottom row gives:

$$\phi^H(i)a^{(k)}(i) = -\frac{1}{\beta^2} \gamma(t_i)a^{(k)}(t_i) \qquad (51)$$

substituting Equation (48) into the definition of $\hat{e}^{(k)}(t_i)$ in Equation (36) now gives $$\hat{e}^{(k)}(t_i) = \phi^H(i)\underline{a}^{(k)}(i) \qquad (52)$$

which, from Equation (51) is equal to:

$$\hat{e}^{(k)}(t_i) = -\frac{1}{\beta^2} \gamma(t_i) a^{(k)}(t_i) \qquad (53)$$

$\hat{e}^{(k)}(t_i)$ is substituted into Equation (35) to yield the required residual $e^{(k)}(t_i)$.

The parameter $\lambda$ described above (see e.g. FIG. 3) accumulates the value of $\|\underline{a}^{(k)}(i)\|^2$ from individual elements of $\underline{a}^{(k)}(i)$ in the appropriate column. Alternatively, the scalar $\|\underline{a}^{(k)}(i)\|^2$ may be updated successively in time: from the norm of Equation (50), we have:

$$\|a^{(k)}(i)\|^2 = \frac{1}{\beta^2} \|a^{(k)}(i-1)\|^2 - \frac{1}{\beta^4} |a^{(k)}(t_i)|^2 \qquad (54)$$

The quantity $x_{out}^{(k)}(t_i)$ computed as above is thus, from Equation (53) or (54) and (35), the required constrained residual $e^{(k)}(t_i)$ of Equation (26) (i having been written for n+i as previously said).

Equation (54) leads to an alternative embodiment of the invention. In the embodiment of FIGS. 2 and 3, the normalization term $\|\underline{a}^{(k)}(i)\|^2$ was computed by summing the squared moduli of transformed constraint elements stored on and updated in constraint cells 46. Equation (54) demonstrates that $\|\underline{a}^{(k)}(i)\|^2$ (i=n, n+1, n+2, ...) may be produced from $\|a^{(k)}(i-1)\|^2$ by dividing by $\beta^2$ and subtracting $|a^{(k)}(t_i)|^2$ divided by $\beta^4$. Accordingly, each multiplier cell 48 may be initialized with $\|\underline{a}^{(k)}(n)\|^2$, and may subsequently update it by applying Equation (54). The term $|a^{(k)}(t_i)|^2$ is received as $x_{in}$ generated as $x_{out}$ by the respective column neighbour constraint cell $46_{4,4+k}$.

Processing cell functions for implementing Equation (54) are illustrated in FIG. 4. These are largely as described with reference to FIG. 3, and consequently only differences will be mentioned. In Mode 1, constraint cells 46 do not have the function of producing sums of squared moduli of their stored values. Instead, this becomes part of the initialization procedure of Mode 2. When a constraint cell 48 receives $x_{in}=1$ in Mode 2, it implements a←s*, i.e. s* is stored. In addition, it computes $|a|^2$ ($=|s^*|^2$) and adds it to the equivalent $\lambda_{in}$ received from its column neighbour constraint cell 48 immediately above. In this way, during Mode 2, the constraint cells 46 accumulate a normalization factor comprising the sum of the squared moduli of their initialization stored values, i.e.

$$\Sigma|a|^2,$$

but do not subsequently operate to update this factor. Instead, each initial sum or factor is passed as $\lambda_{out}$ to a respective column neighbour multiplier cell 48. In Mode 2, when $x_{in}=1$, the value $\lambda$ stored in each multiplier cell 48 becomes changed to $\lambda_{in}$ received from above. Consequently, each multiplier cell $48_{5,4+k}$ receives the first normalization factor $\|\underline{a}^{(k)}(n)\|^2$ (i.e. $\|\underline{a}^{(k)}(i)\|^2$ with i=n), the squared modulus of a respective transformed constraint vector, which it stores as its initialization value of $\lambda$. Subsequently, on reversion to Mode 1, each multiplier cell 48 updates its respective stored value $\lambda$ by computing $\lambda = (\lambda - |x_{in}|^2/\beta^2)/\beta^2$. Now $x_{in}$ for cell $48_{5,4+k}$ is $a^{(k)}(t_i)$ (i=n, n+1, ...), and consequently this $\lambda$ update implements Equation (54); $\lambda$ is then employed as an updated normalization (or division) factor in the computation of $x_{out}$, the residual of Equation (26) as before. This embodiment of the invention requires the constraint cells 46 to accumulate squared moduli during initialization (Mode 2) only, with multiplier cells 48 being responsible for update in this regard. In other respects, the processing cells 42 to 48 function as described with reference to FIGS. 2 and 3.

Referring now to FIG. 5, in which parts previously described are like-referenced, cell processing functions for implementing the square-root free rotation algorithm are illustrated. This algorithm is described by W. M. Gentleman in J. Inst. Maths. Applics., Vol. 12, p.2329 (1973). Its application to systolic array processing is disclosed in British Patent No. 2,143,378B previously referred to, and consequently it will be described in outline only. In this algorithm, the R matrix $\underline{R}(i-1)$ arising from QR decomposition is expressed as:

$$\underline{R}(i-1) = \underline{D}^{\frac{1}{2}}(i-1)\overline{R}(i-1) \qquad (55)$$
$$(i = n, n+1, n+2, ...)$$

where $\underline{D}(i-1)$ is a diagonal matrix having elements stored in the boundary cells 42 and $\overline{R}(i-1)$ is a reduced R matrix of unit upper triangular form stored in the internal cells 44.

The transformed constraint vector stored in a column of constraint cells 46 becomes $\underline{a}^{(k)}(i-1)$ rather than $\overline{a}^{(k)}(i-1)$ as before, where:

$$\underline{a}^{(k)}(i-1) = \underline{D}^{\frac{1}{2}}(i-1)\overline{a}^{(k)}(i-1) \qquad (56)$$

It can be shown that transformation of a vector $\underline{x}$ by the processor 40 operating in non-update mode with square root-free processing functions produces a vector $\underline{z}(i-1)$ given by:

$$\underline{z}(i-1) = \overline{\underline{R}}^{-T}(i-1)\underline{x} \qquad (57)$$

where $\underline{z}(i-1)$ has elements of the kind z. In order to initialize the constraint columns of the processor 40, the kth vector $\underline{z}^{(k)}(i-1)$ is divided by the diagonal matrix $\underline{D}(i-1)$ stored in the boundary cells 42. If the input vector $\underline{x}$ is a constraint vector $\underline{c}^{(k)}$, then:

$$\underline{z}(i-1) = \overline{\underline{R}}^{-T}(i-1)\underline{c}^{(k)} = \underline{D}^{\frac{1}{2}}(i-1)\underline{R}^{-T}(i-1)\underline{c}^{(k)} \qquad (58)$$
$$\text{ie } \underline{z}^{(k)}(i-1) = \underline{D}(i-1)\overline{\underline{a}}^{(k)}(i-1) \qquad (59)$$

Consequently, to obtain elements of the transformed constraint vector $\underline{a}^{(k)}(i-1)$, elements of $\underline{z}^{(k)}(i-1)$ must be divided by respective elements of $\underline{D}(i-1)$ expressed as parameters of the kind d'.

The boundary cells 42 are therefore required to provide rotation parametes c, s, d' and z and store elements d. The processing functions are given by:

M=1 (update mode):

$$d' = \beta^2 d + \delta_{in}|x_{in}|^2$$

$$c \leftarrow \beta^2 d/d'; s \leftarrow \delta_{in}x_{in}/d'$$

$d \leftarrow d'$; $\delta_{out} \leftarrow \bar{c}\delta_{in}$; $z \leftarrow x_{in}$ M=0 (constraint vector transformation mode):

$\bar{c} \leftarrow 1$; $\bar{s} \leftarrow 0$; $d' \leftarrow d$; $\delta_{out} \leftarrow \delta_{in}$; $z \leftarrow x_{in}$ In the update mode, d' is computed from d and $x_{in}$ for the purposes of computing $\bar{c}$, $\bar{s}$, $\delta_{out}$ and updating d. The parameter d' is similar to r for boundary cells in the Givens rotation algorithm, but unlike r no square root is taken. The square root free algorithm avoids electronically complex square root computations, but requires additional rotation parameters to be generated. The parameters $\bar{c}$ and $\bar{s}$ are equivalent to Givens' c and s parameters, and d' is the update of the stored element d equivalent to r as has been said. The parameter z is merely the current boundary cell $x_{in}$ value; $\delta$ provides for cumulative multiplication of the cosine-like parameters $\bar{c}$ along the boundary cell diagonals 56. It is equivalent to $\gamma$ in the Givens functions. $\delta_{in}$ to the first boundary cell $42_{11}$ is 1. The parameters $\bar{c}$, $\bar{s}$, d' and z are output horizontally and pass to internal cells 44 and constraint cells 46.

The internal cell square root free function is:

M=1: $x_{out} \leftarrow x_{in} - zr$ r(updated) $\leftarrow \bar{c}r + \bar{s}^* x_{in}$ M=0: $x_{out} \leftarrow x_{in} - zr$ The internal cells have respective stored elements r equivalent to the like Givens parameter. The element r is updated when M=1 by rotation with $\bar{c}$, $\bar{s}^*$ and $x_{in}$ as in the Givens algorithm. Rotation of $x_{in}$ to produce $x_{out}$ however merely requires subtraction of zr. The internal cells do not employ the forget factor $\beta$. This factor is employed as $\beta^2$ in the boundary cells, and its effect reaches the internal cells by way of c and s; i.e. instead of providing a linear forget factor in the boundary and internal cells, a squared forget factor is applied in the boundary cells with its effect extending indirectly to the internal cells.

The constraint cell function is as follows:

M=1: $x_{out} \leftarrow x_{in} - za$ $a \leftarrow [\bar{c}a + \bar{s}^* x_{in}]/\beta^2$ M=0: $x_{out} \leftarrow x_{in}$; $\lambda_{out} \leftarrow \lambda_{in}$ If $x_{in} = 1$, then $a \leftarrow z^*/d'$ When M=1, the constraint cells 46 operate on $x_{in}$ and update their stored elements a in the same way as internal cells except for the $\beta^2$ update factor. This factor nullifies that applied to the computation of $\bar{c}$ and $\bar{s}$ by the boundary cells 42. The effect is to avoid diminution of stored elements as processing proceeds. Squared moduli of stored elements are accumulated by the $\lambda$ function as in the Givens algorithm, but each of these is modified by multiplication by d' to produce an equivalent result via the square root free algorithm. When M=0 and $x_{in}=1$, in order to initialize the stored element a, the input parameter z is converted to its complex conjugate and divided by d' as previously described to produce elements of the vector $\bar{a}^{(k)*}(i-1)$.

The multiplier cells 48 operate in precisely the same way in the square root free algorithm as they did in the Givens algorithm. An input parameter $\delta$ arising from cumulative $\bar{c}$ multiplication replaces $\gamma$, but these are equivalent and are used in the same manner. Residuals output from the multiplier cells are identical to those computed via the Givens algorithm, ignoring possible differences in numerical rounding errors arising from differing computation routes.

Referring now to FIG. 6, there are shown processing cell functions for an alternative implementation of the square-root free rotation algorithm. This bears the same relationship to FIG. 5 as FIG. 4 does to FIG. 3; each column of constraint cells 46 accumulates a respective sum of squared moduli of transformed constraint elements during Mode 2 only as a multiplier cell initialization procedure. The constraint cells 46 implement this by the operation $\lambda_{out} \leftarrow \lambda_{in} + d'|a|^2$. The multiplier cells 48 are subsequently responsible for updating this normalization factor by means of the operation $\lambda \leftarrow (\lambda - \delta|x_{in}|^2/\beta^2)/\beta^2$. The procedure and its effect are as previously described in relation to FIG. 4, and will not be discussed further.

Two examples of rotation algorithms have been described. The invention is not restricted to any particular rotation algorithm. Generally speaking, a triangularly connected boundary and internal cell sub-array is required to perform QR decomposition by evaluating and applying rotation parameters. Means must be provided for cumulatively multiplying cosine or equivalent non-Givens rotation parameters, but this may be achieved by connecting boundary cells to a cumulative multiplier located externally of the triangular sub-array 50a. The form of rotation and update varies between algorithms. In the Givens algorithm c, s and s* are involved in rotation and update; the square root free algorithm employs z in rotation and c and s* in update. Other algorithms may involve evaluation and application of other forms of rotation parameters. Moreover, as in the square root free algorithm, it may be necessary to modify the $\lambda$ function in accordance with the algorithm to accumulate modified forms of sums of moduli of stored elements in constraint columns.

The constraint sub-array 50b has been exemplified as a plurality of successively disposed or series-connected columns. They may equally well be arranged in parallel; i.e. all constraint columns could be connected to the right-hand triangular sub-array column, since an intervening constraint column merely acts as a delay for rotation parameters and $\gamma$ or $\delta$ terms received by a succeeding constraint column. Constraint column inputs from above are normally zero, so a change to parallel constraint columns only affects input timing when $x_{in} = 1$ in band 2. Analysis shows that the double temporal skew applied to $x_{in}1$ changes to a single temporal skew for constraint columns in parallel.

The mode of operation of the processor 40 has been described in terms of providing an input M in addition to $x_{in}$. M is the mode control bit switching cell operating mode, and in fact any switching means may be employed to achieve this. It is conceptually convenient for analysis purposes to consider M as an input, since it leads to appropriate timing of processor operation. The same function may however be achieved by a counter and delay latch array to switch cells progressively along rows and down columns. Moreover, similar switching may be applied to constraint cells 46 to activate storage of transformed constraint elements, instead of an input $x_{in} = 1$. Top row constraint cells $46_{15}$ to $46_{17}$ do not in fact require an input from above other than a switching signal to activate storage, since their $x_{in}$ values are normally zero. Comparison with the prior art is however facilitated by envisaging zero $x_{in}$ values.

The processor 40 may have fewer constraint cells in special cases where constraint vectors have one or more zero elements. A zero constraint vector element may correspond to a constraint cell which is effectively inoperative, except to the extent that it may be required to relay inputs along rows and down columns of the sub-array 50b. If only required to relay signals, constraint cells may be replaced by two latches to preserve row and column throughput timing. The latches would be equivalent to latches or delays 58 in FIG. 2.

Cell processing functions have been described in relation to complex data, i.e. data in the form of complex numbers having real and imaginary parts. Applications of the invention in fields such as sonar involve data in the form of real numbers, in which case the processing functions in FIGS. 3 and 4 are amended by deleting the complex conjugate symbol * throughout.

The foregoing description envisaged constraint column initialization by transforming constraint vectors in the triangular sub-array 50a after it had been initialized with a preliminary series of data vectors $x^T(t_1)$ to $x^T(t_{n-1})$. There are a number of applications of the invention for which this procedure may be simplified. In the case of an airport radar monitoring incoming aircraft for example, much of the return signal is derived from the constant background scene. Consequently, the constraint sub-array 50b may be initialized with pre-transformed constraint elements corresponding to constraint vectors transformed with the aid of known scene data. This merely requires means to store the elements for use in the constraint cells, and avoids the need for boundary, internal and constraint cells to be switchable between two modes of operation. Moreover, in respect of the embodiments described with reference to FIGS. 4 and 6, the multiplier cells 48 may receive respective initial normalization factors $\|a^{(k)}(n)\|^2$ direct from a store. This avoids the need for constraint cells 46 to compute $\|a^{(k)}(n)\|^2$ during Mode 2.

The processor of this invention may be applied to other problems which require least squares minimization to be carried out subject to several independent linear constraints. Such an application arises for example, in pulse Doppler radar processing where the input element $x_{ij}$ in FIG. 2 would constitute the return received from the ith pulse in the jth range cell and the linear constraint is employed to select a given Doppler frequency. The least squares minimization process has the effect of suppressing clutter from the radar returns.

We claim:

1. A processor for constrained least squares computations including a systolic array of boundary, internal and constraint cells connected to form rows and columns, and wherein:
   (1) the rows include boundary cells connected to constraint cells via numbers of internal cells diminishing down the array by one per row to a row containing no internal cell,
   (2) the columns comprise a first column having a boundary cell, intervening columns comprising individual boundary cells surmounted by respective numbers of internal cells increasing along the array by one per column, and at least one constraint cell column,
   (3) the boundary cells have modes of operation in accordance with a QR decomposition rotation algorithm and comprising evaluating rotation parameters from respective stored elements and input data and updating stored elements,
   (4) the internal and constraint cells have a mode of operation in accordance with the rotation algorithm and comprising receiving evaluated rotation parameters and where necessary deriving their conjugates for application to respective stored elements and input data to provide rotated output data and updated stored elements,
   (5) the array includes nearest neighbor cell interconnection lines providing for evaluated rotation parameters to pass along rows and rotated output data to pass down columns,
   (6) the processor includes constraint column initializing means arranged to provide constraint cells with respective initial stored elements corresponding to constraint vector transformation by an R matrix of decomposed data,
   (7) the array includes means for providing normalization factors corresponding to respective squared moduli of the results arising from constraint vector transformation by an R matrix of decomposed data and subsequent updating in accordance with the rotation algorithm,
   (8) data input means are associated with the array for supplying first row boundary and internal cells with successive temporally skewed data vectors with each of such cells receiving one respective element per vector, and
   (9) the array includes multiplying means arranged to generate cumulatively rotated constraint column outputs multiplied by cumulatively multiplied cosine or equivalent non-Givens rotation parameters and divided by respective normalization factors to produce residuals each derived from rotation parameters computed from a respective data vector and from stored elements prior to update with that data vector.

2. A processor according to claim 1 including:
   (1) respective second modes of operation for the boundary, internal and constraint cells in which the boundary and internal cells suppress their stored element update function and the constraint cells replace their stored elements by initialization factors derived from input rotation parameters,
   (2) data input means arranged to furnish first row boundary and internal cells with a first series of data vectors, at least one constraint vector and a second series of data vectors, and
   (3) switching means arranged to:
      (i) switch boundary and internal cells between modes of operation prior and subsequent to constraint vector transformation in a manner which is progressive along rows and down columns of the array, and
      (ii) switch constraint cells to and from their second mode of operation prior and subsequent to transformed constraint vector element input respectively.

3. A processor according to claim 2 including a plurality of successively disposed constraint cell columns, and wherein the input means is arranged to input a plurality of constraint vectors, the switching means is arranged to switch the constraint cell columns such that each stores a respective conjugate transformed constraint vector during second mode operation, and the multiplying means includes a respective multiplying means for each constraint cell column.

4. A processor according to claim 1 wherein the means for providing normalization factors comprises means associated with constraint cells for implementing an additional constraint cell column function of summing squared moduli of stored elements.

5. A processor according to claim 1 wherein the means for providing normalization factors includes means for updating an initial normalization factor with the aid of constraint cell column outputs, such means being associated with the multiplying means.

6. A processor according to claim 1 including means for weighting computation of residuals in favour of more recent data.

7. A processor according to claim 6 arranged in accordance with the Givens rotation algorithm to provide residuals weighted in favour of more recent data by means of applying a factor $\beta$ between 0 and 1, and wherein:
   (1) boundary and internal cells are arranged to multiply stored elements by $\beta$ prior to evaluating and applying rotation parameters respectively and updating stored elements,
   (2) constraint cells are arranged to multiply stored elements by $\beta$ for the purposes of executing rotation and to divide input data by $\beta^2$ and stored elements by $\beta$ for the purposes of updating stored elements, and
   (3) the multiplying means arranged to multiply residuals by $\beta^{-2}$.

8. A processor according to claim 6 arranged in accordance with the square root free rotation algorithm to provide residuals weighted in favour of more recent data by means of applying a factor $\beta$ between 0 and 1, and wherein:
   (1) boundary cells are arranged to multiply stored values by $\beta^2$ for the purposes of updating stored elements and for evaluating rotation parameters,
   (2) constraint cells are arranged to include multiplication by $\beta^{-2}$ in their stored element update function, and
   (3) the multiplying means is arranged to multiply residuals by $\beta^{-2}$.

9. A processor according to claim 1 wherein the multiplying means includes boundary cell processing means for relatively delaying and cumulatively multiplying cosine or non-Givens equivalent rotation parameters and at least one multiplier cell for receiving constraint cell column outputs and for multiplying such outputs by respective products arising from cumulative multiplication.

10. A processor for constrained least squares computations including a systolic array of boundary, internal and constraint cells connected to form rows and columns, and wherein:
   (1) the rows include boundary cells connected to constraint cells via numbers of internal cells diminishing down the array by one per row to a row containing no internal cell,
   (2) the columns comprise a first column having a boundary cell, intervening columns comprising individual boundary cells surmounted by respective numbers of internal cells increasing along the array by one per column, and at least one constraint cell column,
   (3) the boundary cells have a first mode of operation in accordance with a rotation algorithm and comprising evaluating rotation parameters from respective stored elements and input data and updating stored elements,
   (4) the internal and constraint cells have first modes of operation in accordance with the rotation algorithm and comprising receiving evaluated rotation parameters and where necessary deriving their conjugates for application to respective stored elements and input data to provide rotated output data and updated stored elements,
   (5) the constraint cells are also arranged for accumulation of sums of squared moduli of their stored elements with rotation parameter modification where necessary in accordance with the rotation algorithm,
   (6) the array includes nearest neighbor cell interconnection lines providing for evaluated rotation parameters to pass along rows and rotated output data to pass and sums of squared moduli to accumulate down columns,
   (7) the boundary and internal cells have second modes of operation differing from their first modes in that stored elements are not updated,
   (8) the constraint cells have a second mode of operation in which their stored elements are replaced by respective conjugate elements obtained via constraint vector transformation in the boundary and internal cells during second mode operation,
   (9) the processor includes input means for supplying first row boundary and internal cells with a first series of data vectors, at least one constraint vector and a second series of data vectors in succession and in a temporally skewed manner with each cell receiving one respective element per vector,
   (10) switching means are provided for switching boundary and internal cells between modes of operation in a manner which is progressive along rows and down columns of the array, the switching means also being arranged to switch constraint cells to and from their second mode of operation prior and subsequent to input of respective transformed constraint vector elements, and
   (11) the processor includes multiplying means arranged to multiply cumulatively rotated constraint column outputs by cumulatively multiplied cosine or equivalent non-Givens rotation parameters and to divide products so obtained by respective sums of squared moduli to produce residuals each derived both from rotation parameters computed from a respective data vector and from stored elements prior to update with that data vector.

* * * * *